(12) United States Patent
Uechi et al.

(10) Patent No.: US 8,128,059 B2
(45) Date of Patent: Mar. 6, 2012

(54) SOLENOID VALVE CONTROL APPARATUS AND ACTUATOR

(75) Inventors: Masaaki Uechi, Nissin (JP); Eiji Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 94 days.

(21) Appl. No.: 12/726,020

(22) Filed: Mar. 17, 2010

(65) Prior Publication Data
US 2010/0314567 A1  Dec. 16, 2010

Related U.S. Application Data

(63) Continuation of application No. PCT/JP2009/002655, filed on Jun. 11, 2009.

(51) Int. Cl.
*F16K 31/02* (2006.01)
(52) U.S. Cl. .................................. 251/129.15; 137/884
(58) Field of Classification Search ............. 251/129.01, 251/129.15; 137/884
See application file for complete search history.

(56) References Cited

U.S. PATENT DOCUMENTS
5,842,753 A * 12/1998 Staib et al. ................. 303/119.3
(Continued)

FOREIGN PATENT DOCUMENTS
JP      05-099363     4/1993
(Continued)

*Primary Examiner* — John Fristoe, Jr.
(74) *Attorney, Agent, or Firm* — Oblon, Spivak, McClelland, Maier & Neustadt, L.L.P.

(57) ABSTRACT

In a certain brake control apparatus, a valve main body of a hydraulic control valve and a coil unit are separately formed, are assembled with each other, and are mounted on an actuator block. Further, bias current is secured even though the supply of current is temporarily unnecessary depending on a control state and a period between the termination and the start of the driving of the hydraulic control valve. Accordingly, it may be possible to maintain a contact state between the inner peripheral surface of the coil unit and the outer peripheral surface of the valve main body during the driving control period.

10 Claims, 12 Drawing Sheets

U.S. PATENT DOCUMENTS

| | | | |
|---|---|---|---|
| 6,371,166 B1 * | 4/2002 | Yoshizawa et al. | 137/884 |
| 6,637,724 B1 * | 10/2003 | Mayer | 251/129.15 |
| 6,644,621 B2 * | 11/2003 | Ji et al. | 251/129.02 |
| 7,726,333 B2 * | 6/2010 | Hoshi et al. | 137/341 |

FOREIGN PATENT DOCUMENTS

| | | |
|---|---|---|
| JP | 05-505446 | 8/1993 |
| JP | 09-193788 | 7/1997 |
| JP | 10-507142 | 7/1998 |
| JP | 11-165619 | 6/1999 |
| JP | 2000-193120 | 7/2000 |
| JP | 2000-238632 | 9/2000 |
| JP | 2001-227666 | 8/2001 |
| JP | 2005-035466 | 2/2005 |
| JP | 2005-319868 | 11/2005 |

* cited by examiner

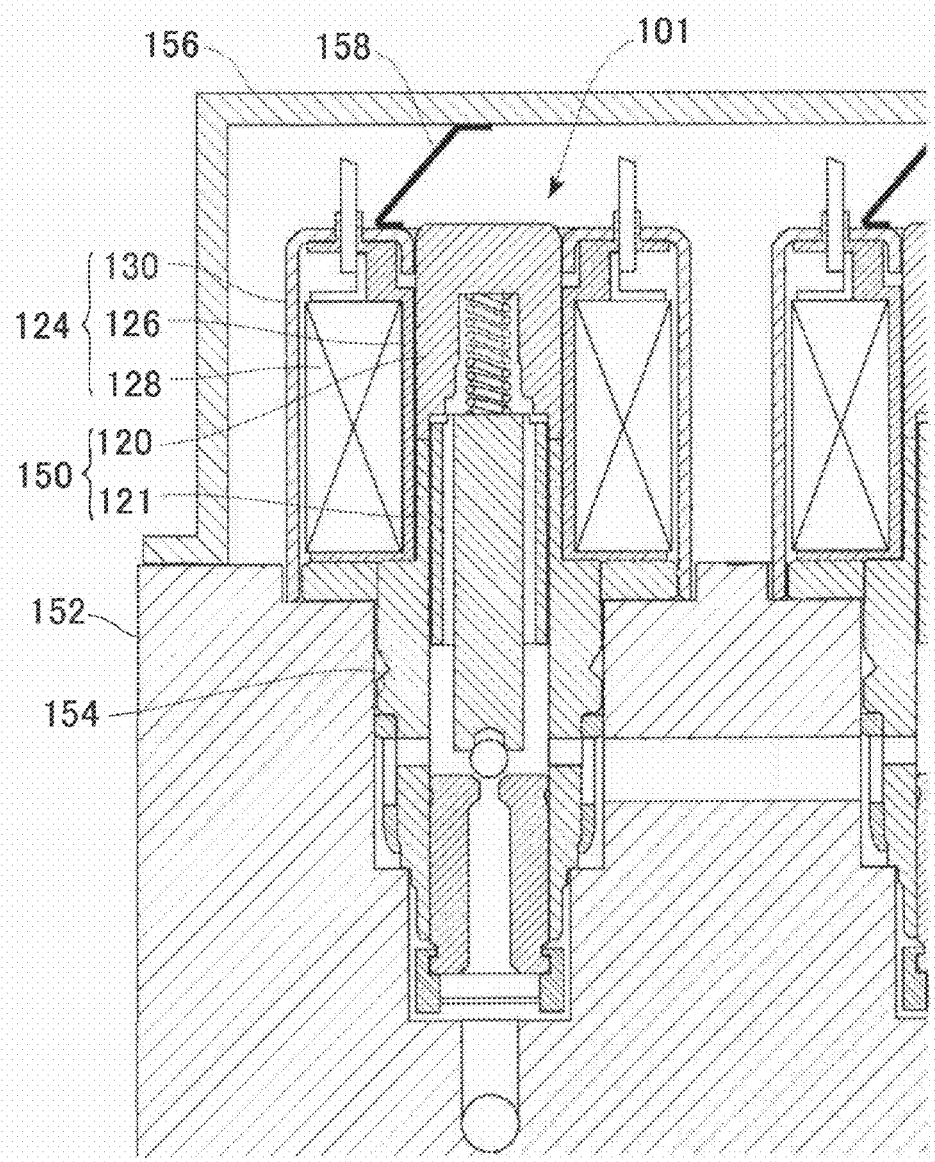

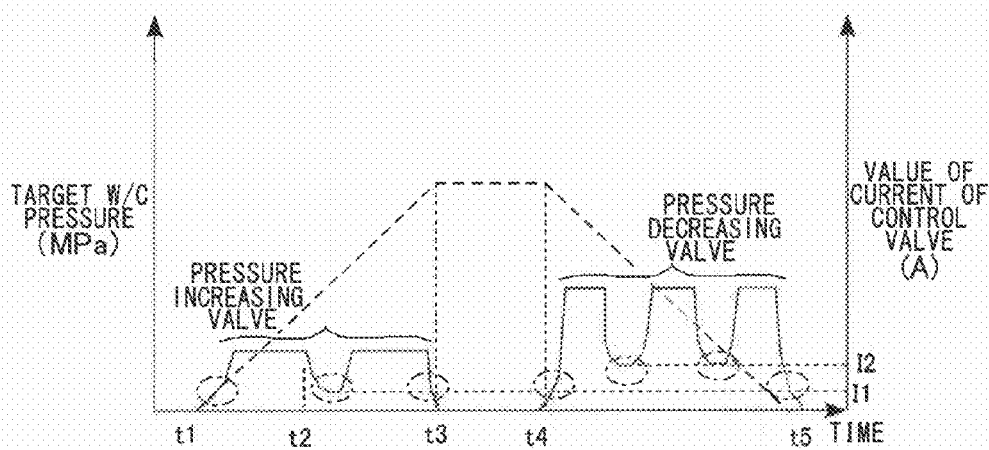

SOLENOID VALVE CONTROL APPARATUS AND ACTUATOR

BACKGROUND OF THE INVENTION

1. Field of the Invention

The present invention relates to an actuator where a solenoid valve is assembled and a solenoid valve control apparatus that controls a solenoid valve.

2. Description of the Related Art

It has heretofore been known a brake apparatus that applies a braking force by generating hydraulic pressure corresponding to an operation force of a brake pedal in a hydraulic circuit and supplying the hydraulic pressure to a wheel cylinder of each wheel (for example, see Patent Document 1). Between a hydraulic pressure source and each wheel cylinder, there are provided various solenoid valves, such as a pressure-increasing valve that is opened at the time of the supply of the hydraulic pressure, a pressure-decreasing valve that is opened at the time of the opening of the hydraulic pressure, and a switching valve that opens and closes at the time of the switching of a supply path of the hydraulic pressure. The brake apparatus adjusts the amount of a brake fluid to be supplied to the wheel cylinders by performing the opening/closing control of these solenoid valves, and applies an appropriate braking force to each wheel by controlling the hydraulic pressure.

In general, this kind of brake apparatus is formed in the form where most of solenoid valves and the hydraulic circuit are unitized as brake actuators. This actuator is formed by airtightly assembling a housing (where a hydraulic pressure passage is formed and bodies of a plurality of solenoid valves are assembled) with a terminal box (which covers and protects solenoids of the solenoid valves exposed from the housing). A circuit board on which a drive circuit for solenoids is mounted is housed in the terminal box. However, there is also a brake apparatus where an electronic control apparatus (hereinafter, referred to as an "ECU") for controlling the actuators is housed in the terminal box for the purpose of the reduction of the size of the entire brake apparatus.

[Patent Document 1] Japanese Patent Application Publication No. 2005-35466

Meanwhile, among these brake actuators, there is a brake actuator where a solenoid valve is formed of a valve main body and a coil part in consideration of an assembling property and the like, and the valve main body and the coil part are mounted on a housing and assembled with each other. Specifically, the valve main body includes a valve part and a solenoid part, the valve part is fixed to the housing by inserting the valve part into a mounting hole of the housing, and the solenoid part is arranged so as to be exposed to the outside of the housing. Further, a solenoid is formed by fitting the coil part to the exposed solenoid part so that the coil part surrounds the solenoid part. A spring or the like, which biases the coil part toward the housing, is provided between the terminal box and the coil part. Accordingly, the spring or the like stably supports the coil part by biasing the coil part toward the housing. In this structure, an appropriate gap is formed between the coil part and the solenoid part in consideration of an assembling property of the solenoid valve.

However, through the verification that has been performed in recent years by inventors, it has been found out that backlash caused by the gap becomes a factor causing an abnormal noise and particularly becomes a problem in a very quiet vehicle such as a hybrid vehicle. Meanwhile, it is considered that this problem is not limited to the brake apparatus and likewise rises in an actuator where a coil part and a valve main body as a solenoid valve are separately formed and then are assembled with each other.

SUMMARY OF THE INVENTION

Accordingly, it is an object of the present invention is to provide a technique that may prevent or suppress the generation of an abnormal noise caused by a gap in an actuator where a coil part and a valve main body as a solenoid valve are separately formed and then are assembled with each other.

In order to solve the above problem, a solenoid valve control apparatus according to an aspect of the present invention includes a base, a solenoid valve, a biasing member, and a control unit. Passages through which a working fluid flows are formed in the base. The solenoid valve includes a valve main body and a coil unit. The valve main body includes a valve part and a solenoid part, and is fixed to the base so that the solenoid part is exposed to the outside of the base. The coil unit is formed of an annular body around which a coil is wound, and is arranged so as to surround the solenoid part. The solenoid valve opens and closes the passages by the opening and closing of the valve part. The biasing member pushes an end face of the coil unit and supports the coil unit by pressing the coil unit against the base. The control unit adjusts an opening of the solenoid valve by controlling the supply of current to the solenoid valve. The control unit controls the supply of current during a period between the start and termination of the driving of the solenoid valve, while securing bias current for maintaining a contact state between at least an inner peripheral surface of the coil unit and an outer peripheral surface of the valve main body.

The "base" used here may be a block-shaped structure including passages through which a working fluid flows, and may be a tubular structure such as a pipe. The "working fluid" may be any one of liquid, gas, and the mixture thereof. The "valve part" means a part that includes a valve body and a valve seat and opens and closes the passages through which the working fluid flows. The "solenoid part" means a part in which an element forming a solenoid is arranged. The "period between the start and termination of the driving of the solenoid valve" means a period until the supply of current is terminated after current is supplied to the solenoid valve in order to control the flow of the working fluid. If the control of the supply of current is duty control, the period means not the turning-on/off periods of current pulses but a period until the duty control is terminated after starting for the driving of the solenoid valve.

According to the aspect, the valve main body of the solenoid valve and the coil unit are separately formed, are assembled with each other, and are mounted on the base. The valve main body is fixed to the base, but the coil unit is supported while being pushed and pressed against the base. Meanwhile, a gap, which is set in consideration of the assembling property, exists between the coil unit and the base. For this reason, if the coil unit is assembled while being inclined with respect to the solenoid part by a pushing portion of the biasing member, the attraction of the solenoid also becomes an unbalanced load due to the imbalance of the gap and is then applied to the coil unit and the solenoid part. In this case, if the direction of a load caused by a biasing force of the biasing member is different from that of the unbalanced load caused by the attraction of the solenoid, the coil unit is displaced in different directions whenever the solenoid is turned on and off. For this reason, the coil unit collides with the solenoid part and thus generates an abnormal noise. According to the aspect, bias current is secured even though the supply of current to the solenoid valve is temporarily unnecessary depending on a control state and the period (hereinafter, referred to as a "driving control period") until the driving of the solenoid valve is terminated after the solenoid valve starts to be driven in order to control the flow of the working fluid. Accordingly, it may be possible to maintain a contact state between the inner peripheral surface of the coil unit and the outer peripheral surface of the valve main body during the driving control period, and to prevent or suppress the generation of an abnormal noise by suppressing the displacement of the coil unit.

Specifically, the solenoid valve may be a normally closed control valve, which maintains a closed state when current is not supplied and is opened by the supply of current. Further, the control unit may set a value of current, which can maintain a closed state of the normally closed control valve, as the bias current. That is, the solenoid valve is a normally closed control valve, it is necessary to secure a function of the normally closed control valve. For this reason, a value of current is set so that a valve closing operation is not hindered and a valve closing operation does not become unstable by bias current when there is performed a control for making the valve return to a closed state by turning off the supply of current under normal circumstances.

Further, the solenoid valve may be a normally open control valve that maintains an opened state when current is not supplied and is closed by the supply of current. Furthermore, the control unit may set a value of current, which maintains an opened state of the normally open control valve, as the bias current. That is, the solenoid valve is a normally open control valve, it is necessary to secure a function of the normally open control valve. For this reason, a value of current is set so that a valve opening operation is not hindered and a valve opening operation does not become unstable by bias current when there is performed a control for making the valve return to an opened state by turning off the supply of current under normal circumstances.

More specifically, the solenoid valve control apparatus may be formed of a hydraulic pressure control apparatus that controls hydraulic pressure of an object to be controlled by controlling the amount of working liquid as the working fluid. The control unit may set target hydraulic pressure according to the control state of the object to be controlled, control the supply of current so that hydraulic pressure of the object to be controlled approaches the target hydraulic pressure, and supply the bias current only when a change rate of the target hydraulic pressure is equal to or smaller than a prescribed criterion value indicating that there is a possibility that an abnormal noise is generated by the collision between the coil unit and the valve main body.

That is, according to the experiment of inventors, it has been verified that the frequency of generation of an abnormal noise is increased as a change rate of the target hydraulic pressure is small and the increase of the hydraulic pressure or the decrease of the hydraulic pressure becomes slow. In other words, if the change rate of the target hydraulic pressure is somewhat large, a problem of an abnormal noise is difficult to occur. Accordingly, in the aspect, a change rate of the target hydraulic pressure, where there is a possibility that an abnormal noise is generated, is set as the "criterion value" by experiments and the like, and the bias current is supplied only when a change rate of the target hydraulic pressure is equal to or smaller than a prescribed criterion value. In contrast, if a change rate of the target hydraulic pressure exceeds the criterion value, that is, if it is assumed that a problem of an abnormal noise does not occur, bias current is not supplied. As a result, it may be possible to suppress unnecessary power consumption.

When the supply of current to the solenoid valve is switched into a turning-off state from a turning-on state and when the supply of current to the solenoid valve is switched into a turning-on state from a turning-off state, the control unit gradually may perform a control so that a target value of current is changed in multiple steps and reaches each value of set current. The "value of set current" used here may be a value of current calculated to make an object (to be controlled) perform an intended operation at the time of the start of the supply of current, and may be zero or a value of current low enough not to affect the operation of the solenoid valve at the time of stop of the supply of current.

According to the aspect, whenever the coil unit is displaced by switching the turning-on/off states of the supply of current, a target value of current at the time of the switching is gradually changed and approaches a value of set current. That is, it may be possible to make the coil unit gently stop on the solenoid part by moderating current supplied at the time of the switching, and to suppress rattle that is caused by collision. As already described, it may be possible to suppress the generation of an abnormal noise during the period by maintaining a contact state between the coil unit and the solenoid part during the driving control period of the solenoid valve. However, since the contact state is not maintained at the time of the start and termination of the driving of the solenoid valve, the coil unit and the solenoid part collide with each other. According to the aspect, particularly, it may be possible to suppress rattle at the time of the start and termination of the driving of the solenoid valve. Accordingly, it may be possible to suppress the generation of an abnormal noise by the entire control of the supply of current to the solenoid valve.

According to another aspect of the invention, there is provided an actuator. The actuator includes a base, a solenoid valve, a biasing member, and a pressing member. Passages through which a working fluid flows are formed in the base. The solenoid valve includes a valve main body and a coil unit. The valve main body includes a valve part and a solenoid part, and is fixed to the base so that the solenoid part is exposed to the outside of the base. The coil unit is formed of an annular body around which a coil is wound, and is arranged so as to surround the solenoid part. The solenoid valve opens and closes the passages by the opening and closing of the valve part. The biasing member pushes an end face of the coil unit and supports the coil unit by pressing the coil unit against the base. The pressing member presses at least one of the solenoid part and the coil unit in one direction during the driving of the solenoid valve and maintains the contact state therebetween. The "base", the "working fluid", and the "valve part", which are used here, are the same as described above.

According to the aspect, a contact state between the solenoid part and the coil unit is maintained during the driving of the solenoid valve by the pressing force of the pressing member. Accordingly, it may be possible to prevent or suppress the generation of an abnormal noise that is caused by the collision between the solenoid part and the coil unit.

Specifically, a protrusion, which protrudes from at least one of the solenoid part and the coil unit toward the other thereof and comes into close contact with the other, may be provided as the pressing member. The "protrusion" used here may be a member, such as an elastic member or a flexible member, that does not hinder the valve main body from being assembled with the coil unit. Alternatively, an elastic body, which presses the coil unit against the solenoid part from the outside of the coil unit, may be provided as the pressing member. According to the aspect, the valve main body and the coil unit are structurally fixed to each other. Accordingly, it may be possible to reliably suppress the generation of an abnormal noise.

Alternatively, the elastic body may be arranged so as to press the coil unit in a direction where the inclined state of the coil unit inclined by a biasing force of the biasing member is maintained. According to the aspect, it may be possible to maintain a contact state between the coil unit and the solenoid part by the pressing force that is applied from the outside by the elastic body.

According to still another aspect of the invention, there is also provided an actuator. The actuator includes a base, a solenoid valve, and a biasing member. Passages through which a working fluid flows are formed in the base. The solenoid valve includes a valve main body and a coil unit. The valve main body includes a valve part and a solenoid part, and is fixed to the base so that the solenoid part is exposed to the outside of the base. The coil unit is formed of an annular body around which a coil is wound and being arranged so as to surround the solenoid part. The solenoid valve opens and closes the passages by the opening and closing of the valve part. The biasing member pushes an end face of the coil unit and fixes the coil unit by pressing the coil unit against the base. The valve main body is fixed to the base while being inclined so that an inner peripheral surface of the coil unit to be inclined by a biasing force of the biasing member is substantially parallel to an outer peripheral surface of the solenoid part. The meanings of the "base", the "working fluid", the "valve part", the "solenoid part", and the like, which are used here, are the same as described above.

That is, if it may be possible to find out a position on which a biasing force of the biasing member is concentrated, it may be possible to guess the inclined state of the coil unit. If the coil unit is fixed to the base so as to substantially parallel to the outer peripheral surface of the solenoid part and correspond to the inclination of the coil unit, it may be possible to make a gap between the coil unit and the solenoid part in an assembly state be substantially uniform in an axial direction. As a result, even if a large difference of the gap is generated in the circumferential direction, the coil unit is attracted in one direction where the gap is decreased. That is, the coil unit is displaced toward the large gap, so that it may be possible to prevent the generation of rattle. Therefore, it may be possible to suppress the generation of an abnormal noise as a whole.

According to the invention, it may be possible to prevent or suppress the generation of an abnormal noise caused by a gap in an actuator where a coil part is assembled with a valve main body as a solenoid valve later.

BRIEF DESCRIPTION OF THE DRAWINGS

FIG. 4 is a partial cross-sectional view illustrating a state where the hydraulic control valve is assembled as a hydraulic actuator.

FIG. 9 is a timing diagram illustrating a method for controlling current supplied to a solenoid of a second embodiment.

DETAILED DESCRIPTION OF THE EMBODIMENTS

Embodiments of the invention will be described below with reference to drawings. In these embodiments, a solenoid valve control apparatus according the invention is applied to a brake control apparatus.

First Embodiment

Figure 1:
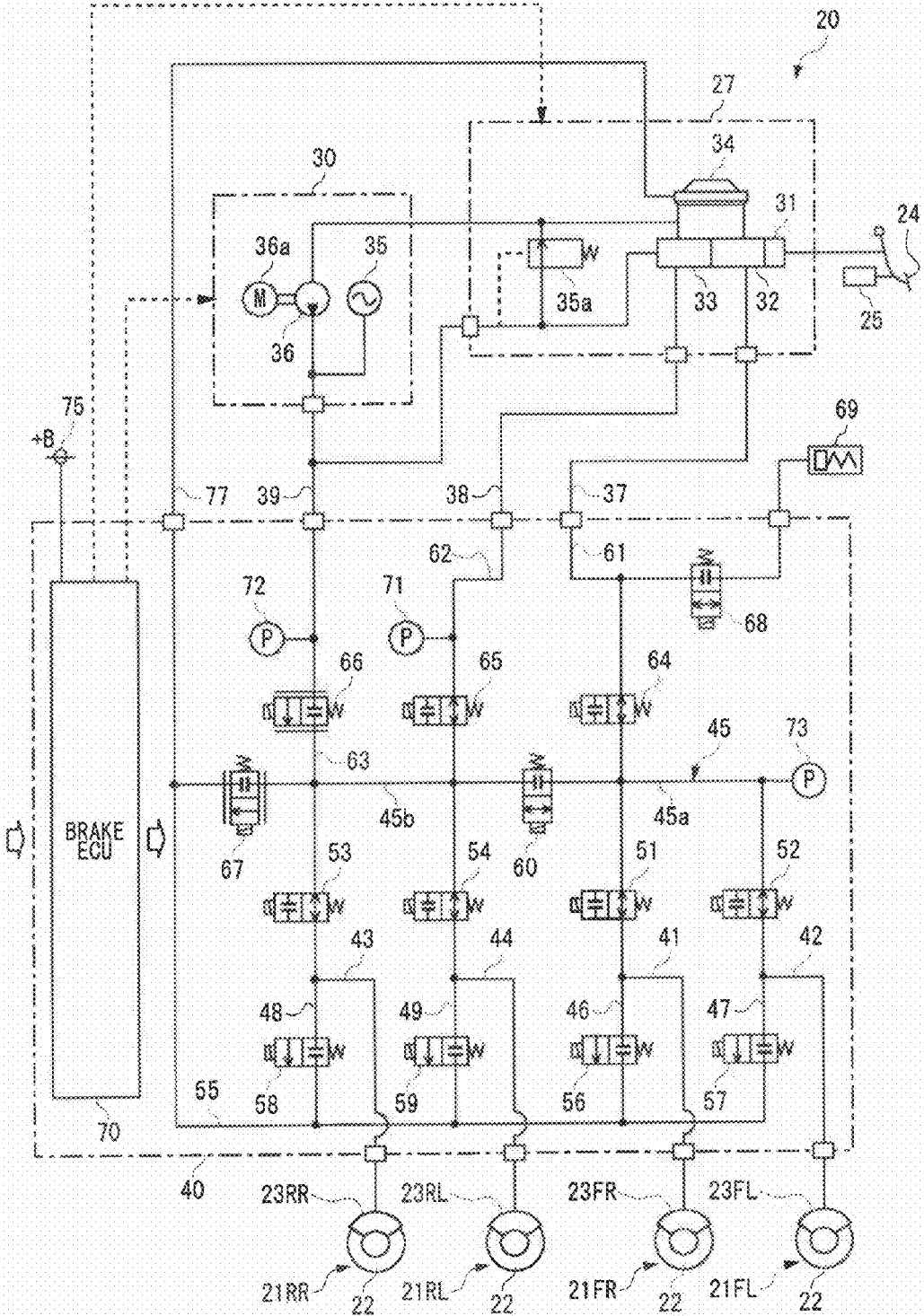
FIG. 1 is a system diagram of a brake control apparatus according to a first embodiment of the invention.

FIG. 1 is a system diagram of a brake control apparatus according to a first embodiment of the invention.

A brake control apparatus 20 forms an electronically-controlled brake system for a vehicle, and controls braking forces that are applied to four wheels of a vehicle. The brake control apparatus 20 is mounted on a hybrid vehicle that includes an electric motor and an internal combustion engine as a travel driving source. In this hybrid vehicle, regenerative braking control for braking a vehicle by regenerating the kinetic energy of the vehicle as electrical energy and hydraulic braking control using the brake control apparatus 20 may be executed for the braking of the vehicle. The vehicle of the present embodiment performs a brake regeneration cooperative control that generates a desired braking force by the combination of the regenerative braking control and the hydraulic braking control.

The brake control apparatus 20 includes disc brake units 21FR, 21FL, 21RR, and 21RL that are provided so as to correspond to the respective wheels, a master cylinder unit 27, a power hydraulic pressure source 30, a hydraulic pressure actuator 40, and a hydraulic circuit that connects them.

The disc brake units 21FR, 21FL, 21RR, and 21RL apply braking forces to a right front wheel, a left front wheel, a right rear wheel, and a left rear wheel of the vehicle, respectively. The master cylinder unit 27 as a manual hydraulic pressure source sends a pressurized brake fluid as working liquid to the disc brake units 21FR to 21RL according to the operation amount of a brake pedal 24 as a brake operating member that is operated by a driver. When power is supplied to the power hydraulic pressure source, the power hydraulic pressure source 30 may send the pressurized brake fluid to the disc brake units 21FR to 21RL independently of the driver's operation of the brake pedal 24. The hydraulic pressure actuator 40 appropriately adjusts the hydraulic pressure of the brake fluid that is supplied from the power hydraulic pressure source 30 or the master cylinder unit 27, and sends the brake fluid to the disc brake units 21FR to 21RL. Accordingly, the braking force, which is applied to each of the wheels by hydraulic braking, is adjusted.

The disc brake units 21FR to 21RL include brake discs 22 and wheel cylinders 23FR to 23RL housed in brake calipers, respectively. Further, the wheel cylinders 23FR to 23RL are connected to the hydraulic pressure actuator 40 through different fluid passages, respectively. Meanwhile, the wheel cylinders 23FR to 23RL are appropriately collectively referred to as "wheel cylinders 23" in the following description.

When a brake fluid is supplied to the wheel cylinders 23 of the disc brake units 21FR to 21RL from the hydraulic pressure actuator 40, brake pads as friction members are pressed against the brake discs 22 that are rotated together with the wheels. Accordingly, a braking force is applied to each of the wheels. Meanwhile, the disc brake units 21FR to 21RL have been used in the present embodiment. However, for example, other braking force applying mechanisms including wheel cylinders 23 such as drum brakes may be used.

The master cylinder unit 27 includes a master cylinder with a hydraulic booster in the present embodiment. The master cylinder unit includes a hydraulic booster 31, a master cylinder 32, a regulator 33, and a reservoir 34. The hydraulic booster 31 is connected to the brake pedal 24, amplifies a pedal force applied to the brake pedal 24, and transmits the amplified pedal force to the master cylinder 32. A brake fluid is supplied to the hydraulic booster 31 from the power hydraulic pressure source 30 through the regulator 33, so that a pedal force is amplified. Further, the master cylinder 32 generates master cylinder pressure that has a predetermined boosting ratio with respect to a pedal force.

The reservoir 34, which reserves a brake fluid, is arranged on the master cylinder 32 and the regulator 33. When a force is not applied to the brake pedal 24, the master cylinder 32 communicates with the reservoir 34. Meanwhile, the regulator 33 communicates with the reservoir 34 and an accumulator 35 of the power hydraulic pressure source 30, uses the reservoir 34 as a low-pressure source, uses the accumulator 35 as a high-pressure source, and generates hydraulic pressure that is substantially equal to the master cylinder pressure. The hydraulic pressure of the regulator 33 is appropriately referred to as "regulator pressure" in the following description. Meanwhile, the master cylinder pressure and the regulator pressure need not to strictly correspond to each other. For example, the master cylinder unit 27 may be designed so that the regulator pressure is slightly higher than the master cylinder pressure.

The power hydraulic pressure source 30 includes the accumulator 35 and a pump 36. The accumulator 35 converts the pressure energy of a brake fluid, which is increased by the pump 36, into a pressure of, for example, about 14 to 22 MPa, and accumulates the pressure energy of the brake fluid as the pressure energy of sealed gas such as nitrogen. The pump 36 includes a motor 36a as a driving source. A suction port of the pump is connected to the reservoir 34, and a discharge port of the pump is connected to the accumulator 35. Further, the accumulator 35 is also connected to a relief valve 35a that is provided at the master cylinder unit 27. If the pressure of the brake fluid in the accumulator 35 is abnormally increased and becomes, for example, about 25 MPa, the relief valve 35a is opened and a high-pressure brake fluid returns to the reservoir 34.

As described above, the brake control apparatus 20 includes the accumulator 35, the regulator 33, and the master cylinder 32 as a source for supplying a brake fluid to the wheel cylinders 23. Further, a master conduit 37 is connected to the master cylinder 32, a regulator conduit 38 is connected to the regulator 33, and an accumulator conduit 39 is connected to the accumulator 35. The master conduit 37, the regulator conduit 38, and the accumulator conduit 39 are connected to the hydraulic pressure actuator 40.

The hydraulic pressure actuator 40 is formed by assembling a plurality of solenoid valves with an actuator block (which corresponds to a "base") in which a plurality of fluid passages is formed. The fluid passages formed in the actuator block include individual fluid passages 41, 42, 43, and 44 and a main fluid passage 45. The individual fluid passages 41 to 44 are branched from the main fluid passage 45 and are connected to the wheel cylinders 23FR, 23FL, 23RR, and 23RL of the corresponding disc brake units 21FR, 21FL, 21RR, and 21RL, respectively. Accordingly, each of the wheel cylinders 23 may communicate with the main fluid passage 45.

Further, ABS holding valves 51, 52, 53, and 54 are provided on the individual fluid passages 41, 42, 43, and 44, respectively. Each of the ABS holding valves 51 to 54 includes a spring and a solenoid that is subject to ON/OFF control. Each of the ABS holding valves is a normally open solenoid valve that is opened when current is not applied to a solenoid. Each of the opened ABS holding valves 51 to 54 allows a brake fluid to flow bi-directionally. That is, each of the opened ABS holding valves allows a brake fluid to flow from the main fluid passage 45 to the wheel cylinder 23, and also allows a brake fluid to flow from the wheel cylinder 23 to the main fluid passage 45 by contrast. If current is supplied to the solenoids and the respective ABS holding valves 51 to 54 are closed, the flow of a brake fluid is interrupted in the individual fluid passages 41 to 44.

Further, the wheel cylinders 23 are connected to a reservoir fluid passage 55 through pressure-decreasing fluid passages 46, 47, 48, and 49 that are connected to the individual fluid passages 41 to 44, respectively. ABS pressure-decreasing valves 56, 57, 58, and 59 are provided on the pressure-decreasing fluid passages 46, 47, 48, and 49. Each of the ABS pressure-decreasing valves 56 to 59 includes a spring and a solenoid that is subject to ON/OFF control. Each of the ABS pressure-decreasing valves is a normally closed solenoid valve that is closed when current is not applied to a solenoid. If each of the ABS pressure-decreasing valves 56 to 59 is closed, the flow of a brake fluid is interrupted in the fluid passages 46 to 49. If current is supplied to the solenoids and the respective ABS pressure-decreasing valves 56 to 59 are opened, the flow of a brake fluid is allowed in the pressure-decreasing fluid passages 46 to 49, so that the brake fluid flows back to the reservoir 34 from the wheel cylinders 23 through the pressure-decreasing fluid passages 46 to 49 and the reservoir fluid passage 55. Meanwhile, the reservoir fluid passage 55 is connected to the reservoir 34 of the master cylinder unit 27 through a reservoir conduit 77.

A separation valve 60 is provided on the main fluid passage 45. The separation valve 60 divides the main fluid passage 45 into a first fluid passage 45a that is connected to the individual fluid passages 41 and 42 and a second fluid passage 45b that is connected to the individual fluid passages 43 and 44. The first fluid passage 45a is connected to the wheel cylinders 23FR and 23FL for the front wheels through the individual fluid passages 41 and 42, and the second fluid passage 45b is connected to the wheel cylinders 23RR and 23RL for the rear wheels through the individual fluid passages 43 and 44.

The separation valve 60 includes a spring and a solenoid that is subject to ON/OFF control. The separation valve is a normally closed solenoid valve that is closed when current is not applied to a solenoid. If the separation valve 60 is closed, the flow of a brake fluid is interrupted in the main fluid passage 45. If current is supplied to the solenoid and the separation valve 60 is opened, the separation valve allows the brake fluid to flow bi-directionally between the first and second fluid passages 45a and 45b.

Further, a master fluid passage 61 and a regulator fluid passage 62, which communicate with the main fluid passage 45, are formed in the hydraulic pressure actuator 40. In more detail, the master fluid passage 61 is connected to the first fluid passage 45*a* of the main fluid passage 45, and the regulator fluid passage 62 is connected to the second fluid passage 45*b* of the main fluid passage 45. Furthermore, the master fluid passage 61 is connected to the master conduit 37 that communicates with the master cylinder 32. The regulator fluid passage 62 is connected to the regulator conduit 38 that communicates with the regulator 33.

A master cut valve 64 is provided on the master fluid passage 61. The master cut valve 64 is provided on a path through which a brake fluid is supplied to each of the wheel cylinders 23 from the master cylinder 32. The master cut valve 64 includes a spring and a solenoid that is subject to ON/OFF control. The master cut valve is a normally open solenoid valve that receives prescribed control current, secures a closed state with an electromagnetic force generated by the solenoid, and is opened when current is not applied to the solenoid. The opened master cut valve 64 allows a brake fluid to flow bi-directionally between the master cylinder 32 and the first fluid passage 45*a* of the main fluid passage 45. If prescribed control current is supplied to the solenoid and the master cut valve 64 is closed, the flow of a brake fluid is interrupted in the master fluid passage 61.

Further, a stroke simulator 69 is connected to the master fluid passage 61 through a simulator cut valve 68 on the upstream side of the master cut valve 64. That is, the simulator cut valve 68 is provided on a fluid passage that connects the master cylinder 32 to the stroke simulator 69. The simulator cut valve 68 includes a spring and a solenoid that is subject to ON/OFF control. The simulator cut valve is a normally closed solenoid valve that receives prescribed control current, secures a closed state with an electromagnetic force generated by the solenoid, and is closed when current is not applied to the solenoid. If the simulator cut valve 68 is closed, the flow of a brake fluid is interrupted between the master fluid passage 61 and the stroke simulator 69. If current is supplied to the solenoid and the simulator cut valve 68 is opened, the simulator cut valve allows a brake fluid to flow bi-directionally between the master cylinder 32 and the stroke simulator 69.

The stroke simulator 69 includes a plurality of pistons or springs, and generates a reaction force corresponding to a force that is applied to the brake pedal 24 by a driver when the simulator cut valve 68 is opened. It is preferable that a stroke simulator having multistage spring characteristics is employed as the stroke simulator 69 in order to improve driver's brake operating feeling.

A regulator cut valve 65 is provided on the regulator fluid passage 62. The regulator cut valve 65 is provided on a path through which a brake fluid is supplied to each of the wheel cylinders 23 from the regulator 33. The regulator cut valve 65 also includes a spring and a solenoid that is subject to ON/OFF control. The regulator cut valve is a normally open solenoid valve that receives prescribed control current, secures a closed state with an electromagnetic force generated by the solenoid, and is opened when current is not applied to the solenoid. The opened regulator cut valve 65 allows a brake fluid to flow bi-directionally between the regulator 33 and the second fluid passage 45*b* of the main fluid passage 45. If current is supplied to the solenoid and the regulator cut valve 65 is closed, the flow of a brake fluid is interrupted in the regulator fluid passage 62.

In addition to the master fluid passage 61 and the regulator fluid passage 62, an accumulator fluid passage 63 is also formed in the hydraulic pressure actuator 40. One end of the accumulator fluid passage 63 is connected to the second fluid passage 45*b* of the main fluid passage 45, and the other end thereof is connected to the accumulator conduit 39 communicating with the accumulator 35.

A pressure-increasing linear control valve 66 is provided on the accumulator fluid passage 63. Further, the accumulator fluid passage 63 and the second fluid passage 45*b* of the main fluid passage 45 are connected to the reservoir fluid passage 55 through a pressure-decreasing linear control valve 67. Each of the pressure-increasing linear control valve 66 and the pressure-decreasing linear control valve 67 includes a spring and a linear solenoid. Each of the pressure-increasing linear control valve and the pressure-decreasing linear control valve is a normally closed solenoid valve that is closed when current is not applied to a solenoid. The openings of the pressure-increasing linear control valve 66 and the pressure-decreasing linear control valve 67 are adjusted in proportion to current supplied to the solenoids of the pressure-increasing linear control valve 66 and the pressure-decreasing linear control valve 67.

The pressure-increasing linear control valve 66 is provided as a pressure-increasing control valve common to the plurality of wheel cylinders 23 that are provided so as to correspond to the respective wheels. Likewise, the pressure-decreasing linear control valve 67 is also provided as a pressure-decreasing control valve common to the respective wheel cylinders 23. That is, in the present embodiment, the pressure-increasing linear control valve 66 and the pressure-decreasing linear control valve 67 are provided as a pair of common control valves for controlling the supply and discharge of a working fluid, which is sent from the power hydraulic pressure source 30, to and from the respective wheel cylinders 23.

Here, pressure difference between an inlet and an outlet of the pressure-increasing linear control valve 66 corresponds to the pressure difference between the brake fluid in the accumulator 35 and the brake fluid in the main fluid passage 45, and the pressure difference between an inlet and an outlet of the pressure-decreasing linear control valve 67 corresponds to the pressure difference between of the brake fluid in the main fluid passage 45 and the brake fluid in the reservoir 34. When the electromagnetic driving force that corresponds to the electricity supplied to the linear solenoid valve of each of the pressure-increasing linear control valve 66 and the pressure-decreasing linear control valve 67 is denoted by F1, the biasing force of the spring is denoted by F2, and the differential pressure acting force that corresponds to the pressure difference between the inlet and the outlet of each of the pressure-increasing linear control valve 66 and the pressure-decreasing linear control valve 67 is denoted by F3, the relationship among F1, F2 and F3 is expressed by the equation, F1+F3=F2. Accordingly, the pressure difference between the inlet and the outlet of each of the pressure-increasing linear control valve 66 and the pressure-decreasing linear control valve 67 is controlled by continuously controlling of the electricity supplied to the linear solenoid valve of each of the pressure-increasing linear control valve 66 and the pressure-decreasing linear control valve 67.

The power hydraulic pressure source 30 and the hydraulic pressure actuator 40 of the brake control apparatus 20 are controlled by a brake ECU 70 as a control unit of the present embodiment. The brake ECU 70 is arranged in a terminal box that is assembled with the actuator block, is formed integrally with the hydraulic pressure actuator 40, and operates by electric power supplied from a battery 75. The brake ECU 70 is mainly formed of a microcomputer including a CPU. The brake ECU includes a ROM that stores various programs, a RAM that temporarily stores data, input and output ports, a communication port, and the like in addition to the CPU. Further, the brake ECU 70 may communicate with, for example, a hybrid ECU (not illustrated), which is at a higher-level hierarchy. The brake ECU controls the pump 36 of the power hydraulic pressure source 30 or the solenoid valves 51 to 54, 56 to 59, 60, and 64 to 68 of the hydraulic pressure actuator 40 based on control signals sent from the hybrid ECU or signals sent from various sensors.

Furthermore, a regulator pressure sensor 71, an accumulator pressure sensor 72, and a control pressure sensor 73 are connected to the brake ECU 70. The regulator pressure sensor 71 detects the pressure of the brake fluid in the regulator fluid passage 62 on the upstream side of the regulator cut valve 65, that is, regulator pressure, and sends a signal indicating a detected value to the brake ECU 70. The accumulator pressure sensor 72 detects the pressure of the brake fluid in the accumulator fluid passage 63 on the upstream side of the pressure-increasing linear control valve 66, that is, accumulator pressure, and sends a signal indicating a detected value to the brake ECU 70. The control pressure sensor 73 detects the pressure of the brake fluid in the first fluid passage 45*a* of the main fluid passage 45, and sends a signal indicating a detected value to the brake ECU 70. The values detected by the respective pressure sensors 71 to 73 are sequentially sent to the brake ECU 70 at predetermined time intervals, and are stored in a predetermined storage area of the brake ECU 70 by a predetermined amount.

When the separation valve 60 is opened and the first and second fluid passages 45*a* and 45*b* of the main fluid passage 45 communicate with each other, an output value of the control pressure sensor 73 represents the hydraulic pressure of the low-pressure side of the pressure-increasing linear control valve 66 and represents the hydraulic pressure of the high-pressure side of the pressure-decreasing linear control valve 67. Accordingly, it may be possible to use the output value in the control of the pressure-increasing linear control valve 66 and the pressure-decreasing linear control valve 67. Further, when the pressure-increasing linear control valve 66 and the pressure-decreasing linear control valve 67 are closed and the master cut valve 64 is closed, an output value of control pressure sensor 73 represents master cylinder pressure. Furthermore, when the separation valve 60 is opened, the first and second fluid passages 45*a* and 45*b* of the main fluid passage 45 communicate with each other, the respective ABS holding valves 51 to 54 are opened, and the respective ABS pressure-decreasing valves 56 to 59 are closed, an output value of the control pressure sensor 73 represents working fluid pressure applied to the respective wheel cylinders 23, that is, wheel cylinder pressure.

In addition, the sensors connected to the brake ECU 70 also include a stroke sensor 25 that is provided to the brake pedal 24. The stroke sensor 25 detects the stroke of the pedal as the operation amount of the brake pedal 24, and sends a signal indicating a detected value to the brake ECU 70. Output values of the stroke sensor 25 are sequentially sent to the brake ECU 70 at predetermined time intervals, and are stored and held in a predetermined storage area of the brake ECU 70 by a predetermined amount.

The brake control apparatus 20 having the above-mentioned structure may perform a brake regeneration cooperative control. The brake control apparatus 20 starts braking when receiving a braking command. The braking command is issued when breaking force is applied to a vehicle, for example, when a driver operates the brake pedal 24. The brake ECU 70 receives a braking command and calculates the required braking force. The brake ECU calculates a required hydraulic pressure braking force, which is a braking force to be generated by the brake control apparatus 20, by subtracting a braking force, which is generated by regeneration, from the required braking force. Here, the information about the braking force, which is generated by regeneration, is supplied to the brake control apparatus 20 from the hybrid ECU. Further, the brake ECU 70 calculates target wheel cylinder pressure, which is the target hydraulic pressure of each of the wheel cylinders 23FR to 23RL, based on the calculated required hydraulic pressure braking force. The brake ECU 70 determines a value of the control current, which is supplied to the pressure-increasing linear control valve 66 or the pressure-decreasing linear control valve 67 based on a feedback control law, so that wheel cylinder pressure reaches the target wheel cylinder pressure.

As a result, in the brake control apparatus 20, a brake fluid is supplied to the respective wheel cylinders 23 from the power hydraulic pressure source 30 through the pressure-increasing linear control valve 66, so that braking forces are applied to the wheels. Further, a brake fluid is discharged from the respective wheel cylinders 23 through the pressure-decreasing linear control valve 67 as necessary, so that the braking forces applied to the wheels are adjusted. In the present embodiment, a wheel cylinder pressure control system includes the power hydraulic pressure source 30, the pressure-increasing linear control valve 66, and the pressure-decreasing linear control valve 67. So-called brake-by-wire type braking force control is performed by the wheel cylinder pressure control system. The wheel cylinder pressure control system is provided in parallel to a path through which a brake fluid is supplied to the wheel cylinders 23 from the master cylinder unit 27.

Specifically, the brake ECU 70 selects any one of a pressure-increasing mode, a pressure-decreasing mode, and a holding mode according to a deviation between target hydraulic pressure, which is a target value of the upstream pressure of the ABS holding valves 51 to 54 (referred to as "holding valve upstream pressure") and actual hydraulic pressure that is the actual hydraulic pressure of the upstream pressure of the ABS holding valves. Then, the brake ECU 70 controls the holding valve upstream pressure. The brake ECU 70 controls the holding valve upstream pressure by controlling the pressure-increasing linear control valve 66 and the pressure-decreasing linear control valve 67. The brake ECU 70 selects the pressure-increasing mode if the deviation exceeds a pressure-increasing threshold, selects the pressure-decreasing mode if the deviation exceeds a pressure-decreasing threshold, and selects the holding mode if the deviation does not satisfy the pressure-increasing threshold and the pressure-decreasing threshold, that is, is in a predetermined setting range. Meanwhile, for example, the deviation is obtained here by subtracting actual hydraulic pressure from target hydraulic pressure. For example, a value measured by the control pressure sensor 73 is used as the actual hydraulic pressure. A target value of the holding valve upstream pressure (the hydraulic pressure in the main fluid passage 45) is used as the target hydraulic pressure.

If the pressure-increasing mode is selected in the present embodiment, the brake ECU 70 supplies feedback current, which corresponds to the deviation, to the pressure-increasing linear control valve 66. If the pressure-decreasing mode is selected, the brake ECU 70 supplies feedback current, which corresponds to the deviation, to the pressure-decreasing linear control valve 67. If the holding mode is selected, the brake ECU 70 does not supply current to the pressure-increasing linear control valve 66 and the pressure-decreasing linear control valve 67. That is, wheel cylinder pressure is increased in the pressure-increasing mode through the pressure-increasing linear control valve 66, and wheel cylinder pressure is decreased in the pressure-decreasing mode through the pressure-decreasing linear control valve 67. Wheel cylinder pressure is held in the holding mode.

When the brake-by-wire type braking force control is performed, the brake ECU 70 closes the regulator cut valve 65 so that the brake fluid sent from the regulator 33 is not supplied to the wheel cylinders 23. Further, the brake ECU 70 closes the master cut valve 64 and opens the simulator cut valve 68. This is to make the brake fluid sent from the master cylinder 32 be supplied not to the wheel cylinder 23 but to the stroke simulator 69 with the driver's operation of the brake pedal 24.

Meanwhile, if it is determined that a control response of the wheel cylinder pressure has abnormality during the control performed by the wheel cylinder pressure control system, there is performed fail-safe processing for mechanically applying a braking force by using the manual hydraulic pressure source. The brake ECU 70 stops the supply of control current to all the solenoid valves in this case. As a result, a path through which a brake fluid is supplied is separated into two systems that correspond to the master cylinder and the regulator. The master cylinder pressure is transmitted to the wheel cylinders 23FR and 23FL for the front wheels, and the regulator pressure is transmitted to the wheel cylinders 23RR and 23RL for the rear wheels. As described above, the linear control of the pressure-increasing linear control valve 66 and the pressure-decreasing linear control valve 67 and the opening/closing control of the ABS holding valves 51 to 54 and the ABS pressure-decreasing valves 56 to 59 has been mainly performed in the control of the wheel cylinder pressure. However, the opening/closing control of the separation valve 60, the master cut valve 64, the regulator cut valve 65, and the simulator cut valve 68 are appropriately performed depending on a braking state.

Figure 2:
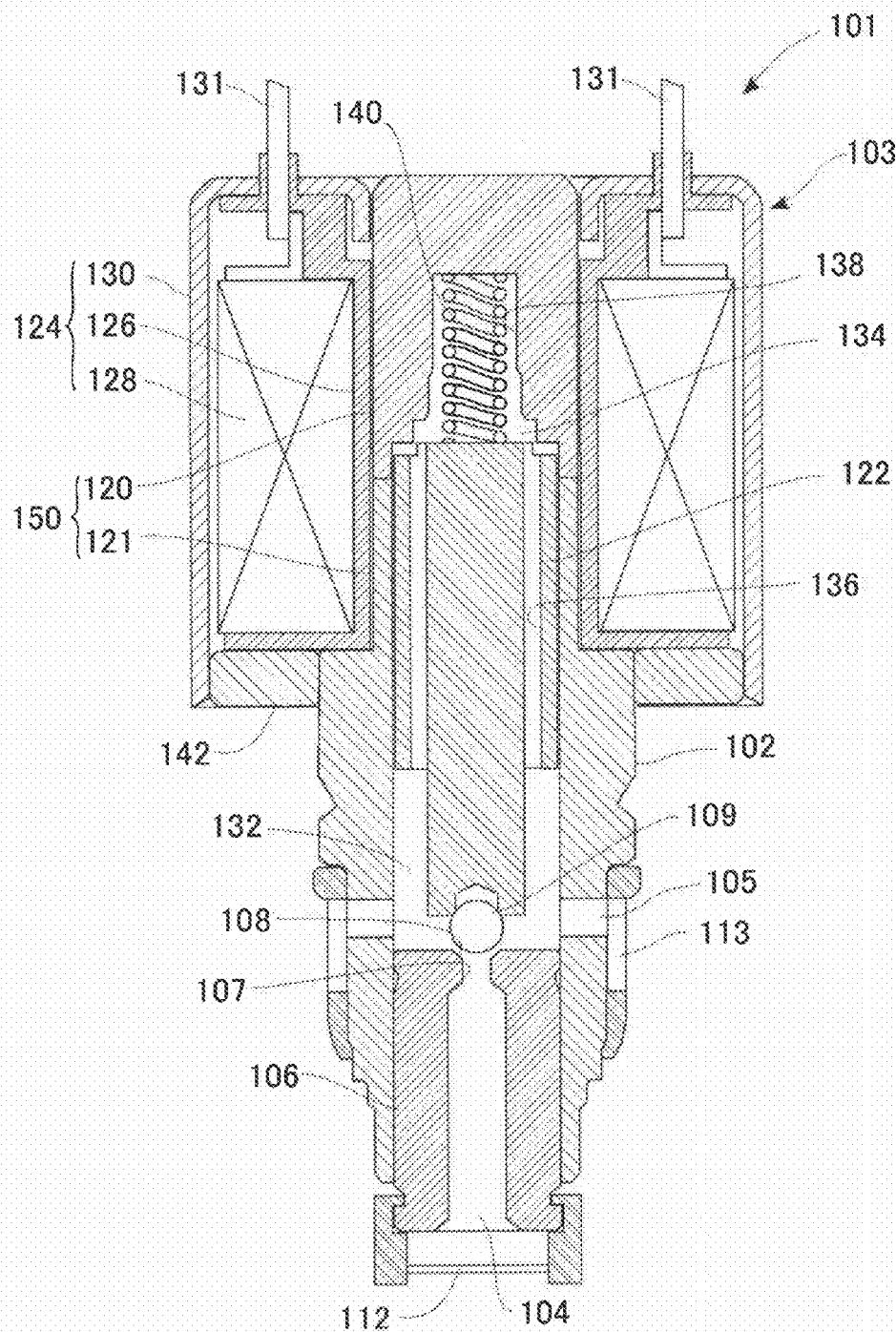
FIG. 2 is a cross-sectional view of a hydraulic control valve.

The specific structure of a hydraulic control valve, which is used as the pressure-increasing linear control valve 66 or the pressure-decreasing linear control valve 67, will be described below. FIG. 2 is a cross-sectional view of a hydraulic control valve. Meanwhile, in the following description, a positional relationship between components will be represented based on a state illustrated in drawings for the convenience of description.

A hydraulic control valve 101 is a solenoid valve where a body 102 including a valve part is formed integrally with a solenoid 103 for controlling the opening of the valve part.

The body 102 has the shape of a stepped cylinder. An introduction port 104 through which a brake fluid is introduced from the upstream side (primary pressure side) is provided at the lower end opening of the body, and a pair of discharge ports 105 through which the brake fluid is discharged to the downstream side (secondary pressure side) is formed at the side of the body near the middle of the body in a longitudinal direction. A valve seat member 106, which has the shape of a cylinder with a bottom, is press-fitted into a passage that allows the introduction port 104 to communicate with the discharge ports 105. A valve hole 107, which passes through the valve seat member 106 in an axial direction, is formed at the center of the bottom portion of the valve seat member 106. An opening of the valve hole 107, which is close to the discharge ports 105, is formed in a tapered shape, and a valve seat 108 is formed of the tapered surfaces of the opening.

A valve body 109 is arranged in the body 102 so as to face the valve seat 108. The valve body 109 is formed of a so-called ball valve body having a spherical shape, and is arranged on the valve seat 108 so as to be attached and detached to and from the side of the discharge port 105. Further, a filter 112 is mounted at the upstream end of the valve seat member 106 so as to cover the introduction port 104, and prevents foreign materials from entering the body 102. Likewise, a filter 113 is also mounted on the side of the body 102 so as to cover the discharge ports 105.

Meanwhile, the solenoid 103 includes a sleeve 120 that has the shape of a cylinder with a bottom and is joined to an upper end of the body 102, a plunger 122 that has the shape of a stepped cylinder and is arranged in a space surrounded by the body 102 and the sleeve 120, and a coil unit 124 that is fitted to the sleeve 120 so as to surround the sleeve. The coil unit 124 includes a cylindrical bobbin 126, an electromagnetic coil 128 that is wound around the bobbin 126, and a case 130 that houses the electromagnetic coil 128 so as to surround the electromagnetic coil from the outside. Harnesses 131 for power supply are connected to each of the connection terminals of the electromagnetic coil 128. The respective harnesses 131 are led out from the case 130, and connected to a drive circuit (not shown).

The sleeve 120 functions as a fixed core that forms a magnetic circuit together with the plunger 122 and the electromagnetic coil 128. The sleeve 120 is made of a magnetic material, and the body 102 is made of a non-magnetic material. Meanwhile, the body 102, the sleeve 120, and an inner structure thereof form a valve main body in the present embodiment. The valve body 109 is joined (welded) to the center of one end of the plunger 122, and the plunger partitions the inside of the valve main body into a valve chamber 132 and a back pressure chamber 134. A plurality of communication passages 136, which passes through the plunger 122 in an axial direction, is formed at the peripheral edge portion of the plunger 122. Accordingly, working liquid, which flows into the valve chamber 132 through the introduction port 104, is also introduced into the back pressure chamber 134 through the communication passages 136. The plunger 122 is arranged close to the back pressure chamber 134 so as to face the sleeve 120.

A guide hole 138 having a predetermined depth is formed on the surface of the sleeve 120 facing the plunger 122, and a coil spring 140 is interposed between the bottom face of the guide hole 138 and the upper end face of the plunger 122 (the end face of the plunger opposite to the valve body 109). The coil spring 140 functions as biasing means that biases the valve body 109 via the plunger 122 in a valve closing direction.

The diameter of the body 102 is reduced so that the outer diameter of the other end of the body is the same as that of the sleeve 120. The end of the reduced diameter portion 121 is joined (welded) to an open end portion of the sleeve 120. Meanwhile, a cylindrical portion, which is formed by the sleeve 120 and the reduced diameter portion 121 in the present embodiment, forms a solenoid part 150 of the valve main body. A disk-shaped member is press-fitted to a base end portion of the body 102 that is positioned at the boundary between the reduced diameter portion 121 and other portion of the body, so that a flange portion 142 is formed. The flange portion 142 is inserted into an open end portion of the case 130. That is, the bobbin 126 of the coil unit 124 is fitted to the solenoid part 150 so as to surround the solenoid part and the flange portion 142 is inserted into the open end of the case 130, so that the coil unit is assembled with the valve main body. However, the valve main body and the coil unit 124 are merely detachably inserted and fitted to each other. Accordingly, the valve main body and the coil unit are not directly fixed to each other, and the coil unit 124 is assembled as the hydraulic pressure actuator 40 and is not directly fixed. The detail thereof will be described below.

Figure 3:
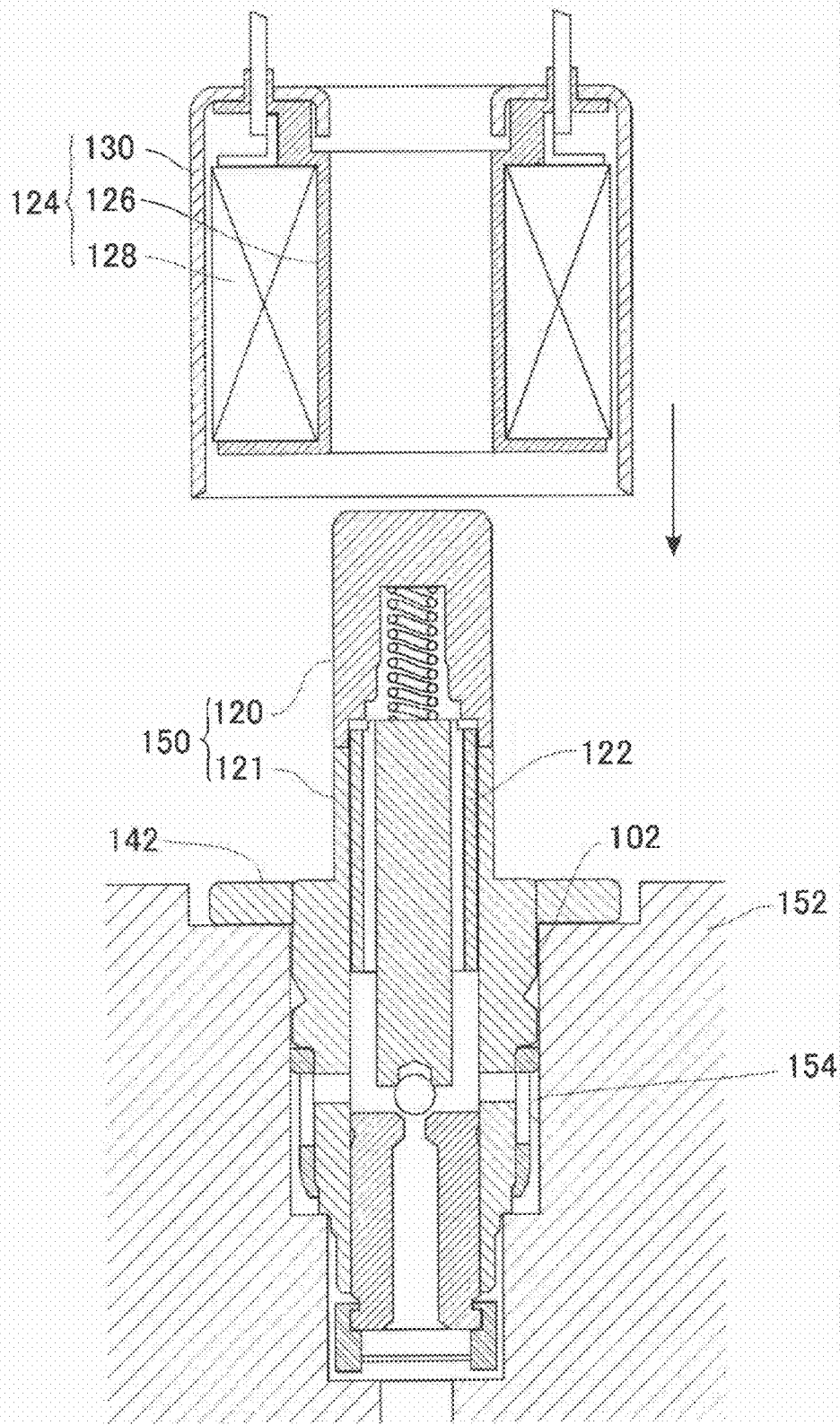
FIG. 3 is a view illustrating an assembly state where the hydraulic control valve is assembled as a hydraulic actuator.

FIG. 3 is a view illustrating an assembly state where the hydraulic control valve is assembled as a hydraulic actuator.

FIG. 4 is a partial cross-sectional view partially illustrating a state where the hydraulic control valve is assembled as a hydraulic actuator.

As illustrated in FIG. 3, a mounting hole 154, which is connected to a hydraulic pressure passage of the hydraulic circuit, is formed in an actuator block 152 of the hydraulic pressure actuator 40. When the hydraulic control valve 101 is assembled as the hydraulic pressure actuator 40, the valve main body is inserted into the mounting hole 154 from the valve part as illustrated in the drawing. In this case, the flange portion 142 is locked to an open end face of the mounting hole 154, so that the valve main body is positioned and the solenoid part 150 is exposed to the outside of the actuator block 152. Further, in this state, the flange portion 142 of the valve main body is joined to the actuator block 152 by caulking. Furthermore, the bobbin 126 is fitted to the solenoid part 150 so as to surround the solenoid part 150 in this state, and the coil unit 124 is assembled so as to be fitted to the valve main body.

Accordingly, the assembling of the hydraulic control valve 101 is completed as illustrated in FIG. 4. When the hydraulic control valve is completely assembled with an actuator such as another solenoid valve or a control substrate of the brake ECU 70 or the like in this way, a terminal box 156 is assembled so as to cover the actuator block 152. In this case, a leaf spring 158 is interposed between the hydraulic control valve 101 and the terminal box 156. The leaf spring 158 functions as a biasing member that pushes the end face of the coil unit 124 (that is, the end face of the case 130 opposite to the valve part) and supports the coil unit 124 by biasing the coil unit 124 toward the actuator block 152. The coil unit 124 has been supported by the leaf spring 158 at one point in the embodiment illustrated in the drawing, but may be supported at two or more points. However, if there is a dimension error or assembly error at each portion of the hydraulic control valve 101, particularly, there is generated the deviation of assembly of the coil unit 124 on the valve main body even though the coil unit is supported at a plurality of points, there is a possibility that a problem of an abnormal noise caused by backlash occurs.

Figure 5A:
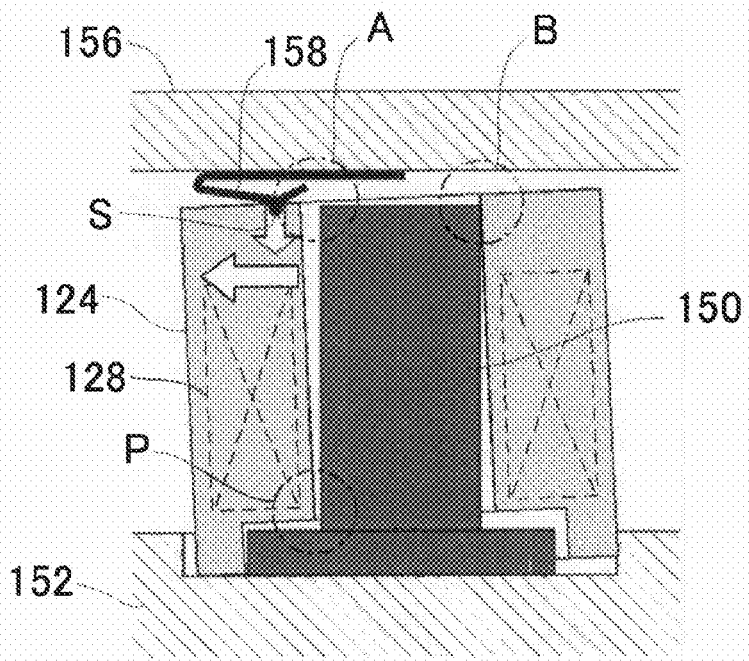
FIGS. 5A and 5B are views illustrating an abnormal-noise generation mechanism.
Figure 5B:
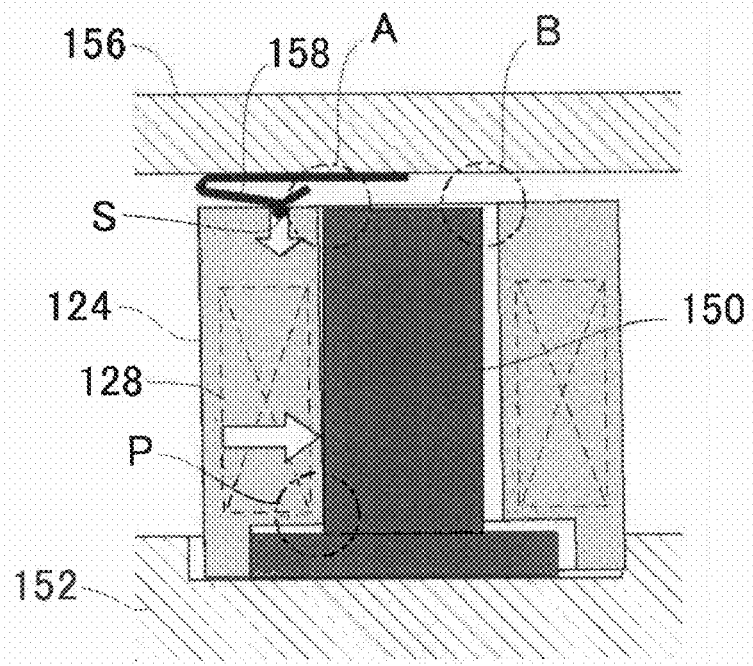

FIG. 5A are views (side views) illustrating an abnormal-noise generation mechanism. FIG. 5A illustrates a state where the coil unit 124 is inclined by a biasing force of the leaf spring 158 when current is not supplied to the coil unit. FIG. 5B illustrates a state where the coil unit 124 is attracted to the solenoid part 150 against the biasing force of the leaf spring 158 when current is supplied to the coil unit.

In the embodiment illustrated in FIGS. 5A and 5B, the valve main body of the hydraulic control valve 101 is mounted on the actuator block 152 with high accuracy and a concentrated load is applied to the coil unit 124 at a point S (one point in a circumferential direction) by the leaf spring 158. As a result, as illustrated in FIG. 5A, the coil unit 124 is mounted while being supported so as to be inclined with respect to the solenoid part 150 of the valve main body. When current is supplied to the coil unit 124 in this state and the solenoid 103 is driven, attraction is particularly increased at a portion P where a gap between the coil unit 124 and the solenoid part 150 is small and the coil unit 124 is displaced so as to be pulled to the right side in FIG. 5A. As a result, as illustrated in FIG. 5B, a portion A of the coil unit, which is positioned on the same side as the portion P with respect to the solenoid part 150, collides with the solenoid part 150 and generates rattle (see an arrow). Meanwhile, in the embodiment illustrated in the drawings, gaps at the portions P and B seem to be equal to each other. However, the electromagnetic coil 128 is leaned to the lower side of the coil unit 124 (to the side of the portion P: a side close to the valve part), so that the influence of the attraction generated by the magnetic circuit is also leaned to the lower side (a side close to the valve part). Accordingly, the attraction is particularly increased at the portion P. After that, if the supply of current to the coil unit 124 is interrupted and the driving of the solenoid 103 is stopped, the coil unit returns to a state illustrated in FIG. 5A due to the biasing force of the leaf spring 158. A portion B of the coil unit, which is opposite to the portion A, collides with the solenoid part 150 at that timing and generates rattle (see an arrow). That is, depending on the assembly state of the solenoid 103, the coil unit 124 may rock like a seesaw and generate rattle whenever the supply of current to the coil unit 124 is switched. For this reason, the coil unit generates rattle.

Figure 6:
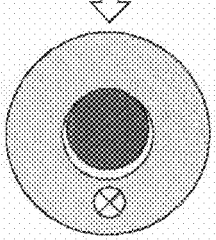
FIG. 6 is a view illustrating an abnormal-noise generation mechanism.

FIG. 6 is a view (plan view) illustrating an abnormal-noise generation mechanism so as to correspond to FIGS. 5A and 5B. The left column of FIG. 6 illustrates an assembly state where an abnormal noise is difficult to be generated as described above, and the right column illustrates an assembly state where an abnormal noise is apt to be generated. A vertical axis of FIG. 6 illustrates ON/OFF states of the supply of current to the solenoid. A white arrow of FIG. 6 illustrates a biasing direction of the leaf spring 158, and a black arrow illustrates an attracting direction of the solenoid 103.

A predetermined clearance (about 0.1 mm in the present embodiment) is formed between the coil unit 124 and the solenoid part 150 in order to maintain an assembling property. Accordingly, the coil unit 124 may be displaced by the clearance in a direction perpendicular to the axial direction thereof. If the biasing direction of the leaf spring 158 is substantially the same as the attracting direction of the solenoid 103 as illustrated in the left column of FIG. 6, the coil unit 124 is pressed in substantially one direction. Accordingly, even though the supply of current to the solenoid 103 repeatedly turned on and off, there is a small possibility that an abnormal noise is generated. However, if the biasing direction of the leaf spring 158 is opposite to the attracting direction of the solenoid 103 as illustrated in the right column of FIG. 6, the coil unit 124 is pressed bi-directionally. Accordingly, whenever the supply of current to the solenoid 103 is repeatedly turned on and off, there is a possibility that an abnormal noise is generated due to the displacement of the coil unit 124. However, whether the assembly state where the coil unit 124 is assembled with the solenoid part 150 corresponds to any one of the right and left columns depends on a probability, and is not clear. For this reason, the present embodiment provides a technique that can prevent or suppress the generation of an abnormal noise even in the assembly state illustrated in the right column of FIG. 6 as described below.

Figure 7A:
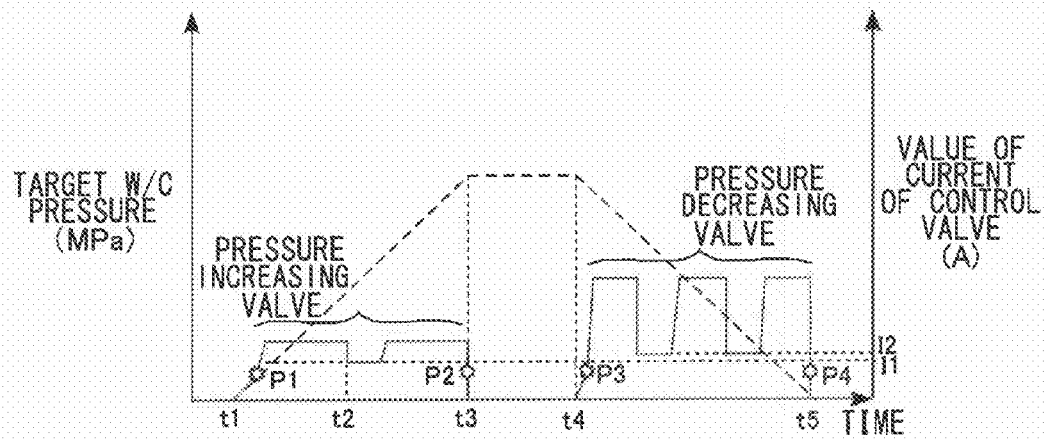
FIGS. 7A and 7B are timing diagrams illustrating a method for controlling current supplied to a solenoid.
Figure 7B:
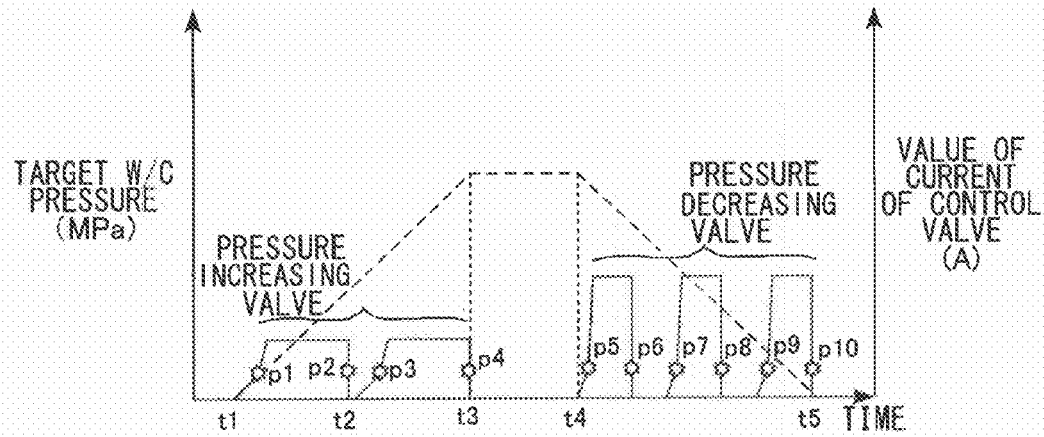

FIGS. 7A and 7B are timing diagrams illustrating a method for controlling current supplied to the solenoid. FIG. 7A illustrates a method for controlling current according to the embodiment and FIG. 7B illustrates a method for controlling current according to a comparative example. In each of the drawings, a broken line illustrates target hydraulic pressure (target wheel cylinder pressure: W/C pressure), and a solid line illustrates target current to be supplied to the hydraulic control valve 101. A horizontal axis indicates the passage of time.

Here, the control apparatus for controlling current supplied to the hydraulic control valve 101 will be described first. As described above, the brake ECU 70 sets target hydraulic pressure according to a braking state, calculates a value of current to be supplied to the hydraulic control valve 101 (exactly, the solenoid 103 of the hydraulic control valve 101), and outputs a duty ratio thereof as a feed forward term. The brake ECU performs the feedback of the wheel cylinder pressure (actual hydraulic pressure) that is actually obtained from the result of the control of current using the duty ratio, and performs feedback control according to the deviation between the target hydraulic pressure and the actual hydraulic pressure.

The brake ECU 70 includes a PWM signal output circuit that outputs a PWM signal used for the duty control of the hydraulic control valve 101, a drive circuit that turns on and off the supply of the current to the hydraulic control valve 101 according to the PWM signal, and an A/D converter that converts an analog signal to a digital signal. Meanwhile, since the structure of the circuit used for the PWM control has been well known, the detailed description will not be repeated.

When a braking command is input to the brake ECU 70 based on the operation of the brake pedal 24, the brake ECU 70 sequentially calculates a required hydraulic pressure braking force and target hydraulic pressure as described above and calculates a value of control current, which is to be supplied to the hydraulic control valve 101 according to a braking state, as target current. Further, the brake ECU converts the target current into a duty ratio with reference to a control map where a correspondence relationship between target current that is current to be supplied to the solenoid 103 of the hydraulic control valve 101 and a duty ratio that is set to obtain the target current is set in advance. The brake ECU 70 outputs a PWM signal by driving the PWM signal output circuit depending on the duty ratio and, and changes the current supplied to the solenoid 103 by driving the drive circuit.

Here, for the convenience of description, a comparative example employing a method in the related art will be described first and the present embodiment will then be described. That is, in a comparative example illustrated in FIG. 7B, target hydraulic pressure (target wheel cylinder pressure) illustrated by a broken line is set in order to obtain a requested hydraulic pressure braking force corresponding to a braking command. The brake ECU 70 starts supply current to the hydraulic control valve 101 (the pressure-increasing linear control valve 66) at a time t1. However, until hydraulic pressure reaches the final target value, actual hydraulic pressure (holding valve upstream pressure detected by the control pressure sensor 73) becomes higher than the dead zone of the target hydraulic pressure. Accordingly, the brake ECU makes a value of the target current be zero, that is, turns off the supply of current at a time t2. After that, since the actual hydraulic pressure is decreased and becomes lower than the dead zone, the supply of current is turned on again, the supply of current is turned off, that is, the driving of the hydraulic control valve 101 is terminated at a time t3 where the actual hydraulic pressure reaches the final target hydraulic pressure (a flat portion in FIG. 7B). Here, the supply of current has been turned off once at the time t2, but the driving of the hydraulic control valve 101 is terminated at not the time t2 but the time t3.

The "dead zone" used here means a range that defines the fluctuation width of the actual hydraulic pressure allowable for the target hydraulic pressure. A high dead zone higher than the target hydraulic pressure and a low dead zone lower than the target hydraulic pressure are set in advance. That is, when actual hydraulic pressure increases from the target hydraulic pressure so as to exceed the high dead zone, the supply of current is turned off once, so that the supply of excess current is prevented. Meanwhile, when actual current decreases so as to be smaller than the low dead zone, the supply of current is turned on again, so that hydraulic pressure is adjusted to target hydraulic pressure. If actual hydraulic pressure reaches the final target hydraulic pressure while the supply of current is repeatedly turned on and off in this way, the hydraulic control valve 101 is closed.

Subsequently, in order to reduce a braking force after the state is maintained during a set period, current starts to be supplied to the hydraulic control valve 101 (the pressure-decreasing linear control valve 67) at a time t4. Accordingly, likewise, the supply of current is controlled in consideration of a dead zone. Even after the pressure-decreasing linear control valve 67 starts to be driven, the supply of current is turned off once whenever actual hydraulic pressure exceeds the dead zone. Further, the supply of current is turned off and the driving of the hydraulic control valve 101 is terminated at a time t5 where actual hydraulic pressure becomes zero. In the comparative example, the coil unit 124 rocks as described above at relatively low-current points p1 to p10 by the switching control of the supply of current whenever the supply of current to the solenoid 103 is turned on and off. Accordingly, the coil unit generates an abnormal noise.

For the purpose of the suppression of the generation of the abnormal noise, constant bias current is secured as illustrated in FIG. 7A in the present embodiment without reliably turning off the supply of current during the driving of the hydraulic control valve 101. That is, bias current I1 is maintained during the driving of the pressure-increasing linear control valve 66 in the present embodiment even though the supply of current is turned off in the comparative example. The bias current I1 is a value of current capable of maintaining a state where the coil unit 124 is pressed against the solenoid part 150 in one direction and comes into contact with the solenoid part. The bias current is set to a value higher than a value of current that generates an abnormal noise. However, a value of current capable of maintaining a closed state of the hydraulic control valve 101, which is a normally closed solenoid valve, is set as the bias current I1. For example, smaller one of a value of current, which is smaller than a value of valve opening current by a predetermined value (for example, a value of valve opening current—80 mA), and a specific fixed value (for example, 0.4 A) may be set as the bias current I1. The predetermined value may be based on the deviation of the valve opening current that is obtained during the hydraulic pressure control of the hydraulic control valve 101. The fixed value is a value of the minimum current that is required to maintain the contact state of the coil unit, and may be a value that is experimentally obtained. As a result, as illustrated in the drawing, an abnormal noise is generated depending on the assembly state of the pressure-increasing linear control valve 66 at the time of the start of driving (point P1) and at the time of termination (point P2). However, even though a value of current decreases to the bias current I1 during the driving, the generation of an abnormal noise is prevented.

Likewise, bias current I2 is maintained during the driving of the pressure-decreasing linear control valve 67 in the present embodiment even though the supply of current is turned off in the comparative example. The bias current I2 is a value of current capable of maintaining a state where the coil unit 124 is pressed against the solenoid part 150 in one direction and comes into contact with the solenoid part. The bias current is set to a value higher than a value of current that generates an abnormal noise. However, a value of current capable of maintaining a closed state of the hydraulic control valve 101, which is a normally closed solenoid valve, is set as the bias current I2. For this reason, as illustrated in the drawing, an abnormal noise is generated depending on the assembly state of the pressure-decreasing linear control valve 67 at the time of the start of driving (point P3) and at the time of termination (point P4). However, even though a value of current decreases to the bias current I2 during the driving, the generation of an abnormal noise is prevented. That is, when the hydraulic control valve 101 is driven, the generation of an abnormal noise is suppressed as a whole.

Figure 8:
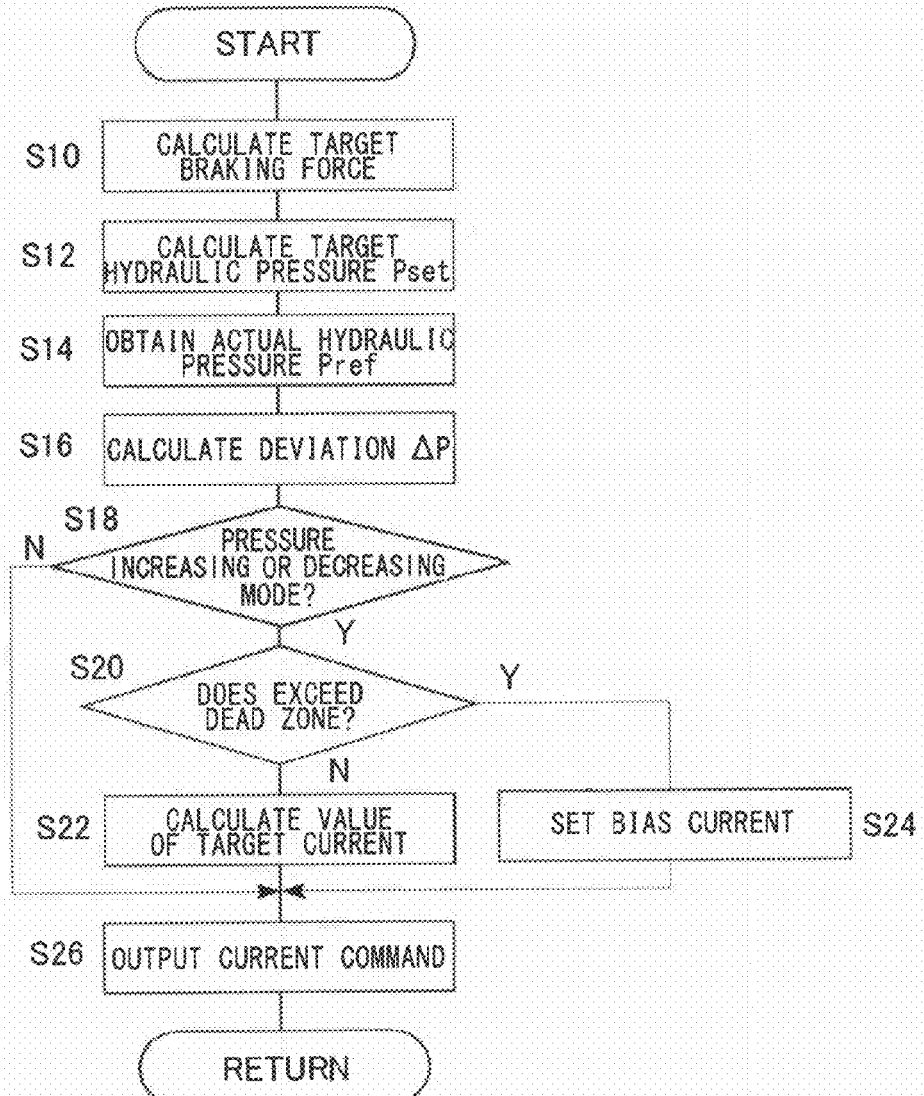
FIG. 8 is a flowchart illustrating a flow of brake control processing.

FIG. 8 is a flowchart illustrating a flow of brake control processing.

The brake ECU 70 repeatedly performs the processing illustrated in FIG. 8 at an interval of several ms (6 ms in the present embodiment) while a linear control mode is performed.

First, the brake ECU 70 calculates a target braking force on the stepping operation of the brake pedal 24 (S10). Further, the brake ECU calculates target hydraulic pressure Pset of the holding valve upstream pressure based on a hydraulic pressure braking force that is obtained by subtracting a regenerative braking force from the target braking force (S12).

Subsequently, the brake ECU 70 performs the feedback of actual hydraulic pressure Pref of the holding valve upstream pressure that is detected by the control pressure sensor 73 (S14), and calculates a deviation $\Delta P$ (=Pset−Pref) between the target hydraulic pressure Pset and the actual hydraulic pressure (S16). Further, when the brake ECU determines that the present mode is a pressure-increasing mode or a pressure-decreasing mode (Y in S18) and hydraulic pressure does not exceed dead zones of target hydraulic pressure for pressure-increasing/pressure-decreasing, respectively, (N in S20), a feedback gain G depending on a control state is set, and a value of output current supplied to the pressure-increasing linear control valve 66 and the pressure-decreasing linear control valve 67 is calculated as a value of target current by using the feedback gain G and the deviation $\Delta P$ (S22), and the value of the output current is output as a current command (S26). Meanwhile, the "dead zone" used here is a dead zone where current to be supplied is decreased rapidly, a pressure-increasing dead zone is an upper limit dead zone with respect to target hydraulic pressure, and a pressure-decreasing dead zone is a lower limit dead zone with respect to target hydraulic pressure.

In this case, in the pressure-increasing mode, the control current supplied to the pressure-increasing linear control valve 66 is the sum of valve opening current Ia0 set according to the pressure difference between the inlet and the outlet of the control valve (that is, pressure difference between the accumulator pressure and the holding valve upstream pressure), and feedback current set according to the deviation $\Delta P$. The valve opening current is represented by a linear function that uses pressure difference as a variable, and is generally given as feed forward current. The feedback current is given by the product of the feedback gain G and the deviation $\Delta P$. That is, the brake ECU 70 calculates control current Ia and Ir of the following expressions for the pressure-increasing linear control valve 66 and the pressure-decreasing linear control valve 67 in the pressure-increasing mode. Further, the brake ECU outputs a duty ratio, which targets on the control current, as a command value.

$Ia=Ia0+G\cdot\Delta P$ $Ir=0$

Meanwhile, in the pressure-decreasing mode, the brake ECU 70 does not supply control current to the pressure-increasing linear control valve 66 and supplies control current to the pressure-decreasing linear control valve 67. Accordingly, the pressure-increasing linear control valve 66 is closed and the pressure-decreasing linear control valve 67 is opened, so that the holding valve upstream pressure is decreased. The control current supplied to the pressure-decreasing linear control valve 67 is the sum of valve opening current Ir0 set according to the pressure difference between the inlet and the outlet of the control valve (that is, the holding valve upstream pressure) and feedback current set according to the deviation $\Delta P$. The valve opening current is represented by a linear function that uses pressure difference as a variable, and is generally given as feed forward current. The feedback current is given by the product of the feedback gain G and the deviation $\Delta P$. That is, the brake ECU 70 calculates control current Ia and Ir of the following expressions for the pressure-increasing linear control valve 66 and the pressure-decreasing linear control valve 67 in the pressure-decreasing mode. Further, the brake ECU outputs a duty ratio, which targets on the control current, as a command value.

$Ia=0$ $Ir=Ir0+G\cdot\Delta P$

Meanwhile, when hydraulic pressure exceeds the dead zones of target hydraulic pressure for pressure-increasing/pressure-decreasing, respectively, (Y in S20), a value of target current is set to bias current (S24) and the value of target current is output as a current command (S26). In this case, the bias current I1 is set in the case of the pressure-increasing mode and the bias current I2 is set in the case of the pressure-decreasing mode. Accordingly, it may be possible to prevent the rapid decrease of the control current and the generation of an abnormal noise that is caused by the rocking of the coil unit 124.

As described above, in the present embodiment, the valve main body of the hydraulic control valve 101 and the coil unit 124 are separately formed, and are assembled with each other when they are mounted on the actuator block 152. The valve main body is fixed to the actuator block 152, but the coil unit 124 is merely supported so as to be pushed and pressed against the actuator block 152 by the leaf spring 158. For this reason, in some biasing portions of the leaf spring 158, the direction of a biasing force applied to the coil unit 124 is opposite to the direction of the attraction of the solenoid 103, so that the coil unit 124 may rock. However, according to the present embodiment, bias current is secured even though the supply of current is temporarily unnecessary depending on a control state and a period (a driving control period) between the termination and the start of the driving of the hydraulic control valve 101. Accordingly, it may be possible to maintain a contact state between the inner peripheral surface of the coil unit 124 and the outer peripheral surface of the valve main body during the driving control period, and to prevent or suppress the generation of an abnormal noise.

Second Embodiment

A second embodiment of the invention will be described below. The present embodiment is substantially the same as the first embodiment except that the control of the supply of current supplied to the hydraulic control valve 101 of the present embodiment is slightly different from that of the first embodiment. Accordingly, the description of the structure and processing common to the first embodiment will not be repeated appropriately.

FIG. 9 is a timing diagram illustrating a method for controlling current supplied to a solenoid 103 of a second embodiment. FIG. 9 corresponds to FIG. 7A. A broken line of FIG. 9 illustrates target hydraulic pressure (target wheel cylinder pressure), and a solid line illustrates target current to be supplied to a hydraulic control valve 101. A horizontal axis indicates the passage of time.

Like in the first embodiment, at least constant bias current is secured during the driving of the hydraulic control valve 101 in the present embodiment. Further, when a state returns to a steady state from a bias current supplying state and when current is switched to bias current from a steady state where a value of target current is maintained substantially constant at the time of the start and termination of the supply of current, control is gradually performed so that a target value of current is changed in multiple steps and reaches each value of set current. That is, the behavior of the coil unit 124 is stabilized by moderating supplied current. Accordingly, it may be possible to prevent the generation of an abnormal noise during the driving of the hydraulic control valve 101 and the generation of an abnormal noise, which could not have been avoided in the first embodiment, at the time of the start and termination of the driving of the hydraulic control valve (see portions illustrated by a dashed line in FIG. 9). That is, like in the comparative example, the coil unit 124 rocks at a timing where the supply of current is turned on and off at the time of the start and termination of the driving of the hydraulic control valve 101. However, it may be possible to make the coil unit 124 gently stop on the solenoid part 150. In this way, it may be possible to prevent or suppress the generation of an abnormal noise during the entire control of the hydraulic control valve 101 by combining the control method of the present embodiment with the control method of the first embodiment.

Third Embodiment

A third embodiment of the invention will be described below. The present embodiment is to prevent the generation of an abnormal noise by the structure of a hydraulic control valve. Accordingly, the control method of the first or second embodiment does not need to be used necessarily.

Figure 10A:
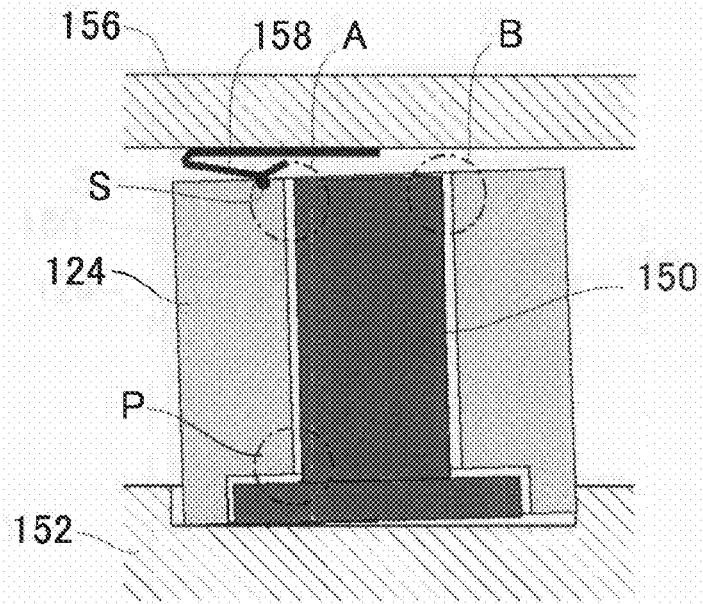
FIGS. 10A and 10B are views illustrating the structure of main parts of a hydraulic control valve according to a third embodiment.
Figure 10B:
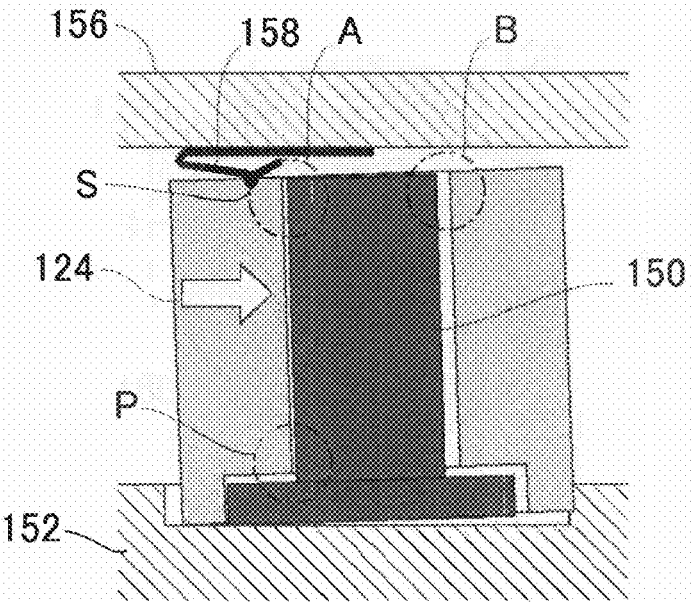

FIGS. 10A and 10B are views illustrating the structure of main parts of a hydraulic control valve according to a third embodiment. FIG. 10A is a view illustrating the hydraulic control valve to which current is not supplied, and FIG. 10B is a view illustrating the hydraulic control valve to which current is supplied.

In the hydraulic control valve of the present embodiment, a valve main body is fixed to an actuator block 152 while being inclined so that an inner peripheral surface of a coil unit 124 to be inclined by a biasing force of a leaf spring 158 is substantially parallel to an outer peripheral surface of a solenoid part 150. That is, as described above, a concentrated load is applied to the coil unit 124 at a point S (one point in a circumferential direction) by the leaf spring 158. However, since the point S is structurally clear, it may be possible to find out an inclined direction of the coil unit 124 where the point S is a point of application.

Then, the valve main body is fixed to the actuator block 152 so that the solenoid part 150 is inclined in the same direction of the inclined direction of the coil unit 124 that is found out as described above. Accordingly, it may be possible to make a gap between the coil unit 124 and the solenoid part 150 in an assembly state be substantially uniform in an axial direction as illustrated in FIG. 10A. As a result, even though a difference of the gap is generated in the circumferential direction as illustrated in FIG. 10B, the coil unit 124 is attracted as illustrated by an arrow of FIG. 10B in one direction where the gap is decreased. That is, the coil unit 124 is displaced toward the large gap, so that rattle is not generated. Therefore, the generation of an abnormal noise is suppressed as a whole.

Fourth Embodiment

A fourth embodiment of the invention will be described below. The present embodiment is to prevent the generation of an abnormal noise by the structure of a hydraulic control valve. Accordingly, the control method of the first or second embodiment does not need to be used necessarily.

Figure 11A:
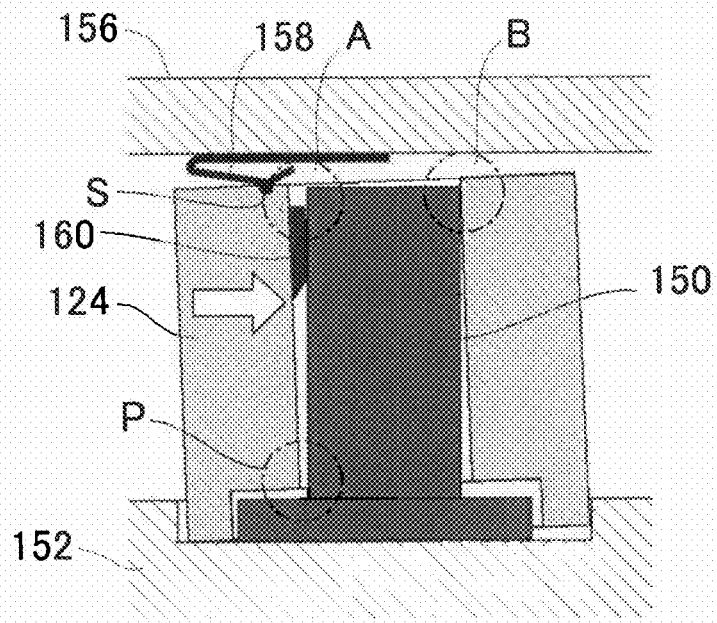
FIGS. 11A and 11B are views illustrating the structure of main parts of a hydraulic control valve according to a fourth embodiment.
Figure 11B:
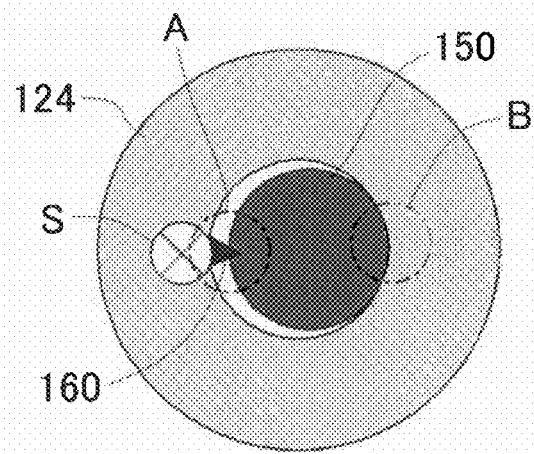

FIGS. 11A and 11B are views illustrating the structure of main parts of a hydraulic control valve according to a fourth embodiment. FIG. 11A is a side view of the hydraulic control valve, and FIG. 11B is a plan view of the hydraulic control valve.

In the hydraulic control valve of the present embodiment, a wedge 160 (which corresponds to a "protrusion") is provided at a position in a circumferential direction, which corresponds to a point S on an inner peripheral surface of a coil unit 124 and is positioned at a rear end portion of the coil unit 124 in an insertion direction where the coil unit is inserted into a solenoid part 150. In the present embodiment, the wedge 160 is made of a resin material in the shape of a triangular prism. However, the shape of the wedge is not limited thereto, and the wedge may be an elastic body such as a spring. Tapered surfaces are formed at the end portion of the wedge 160 in order to facilitate the insertion of the coil unit 124 to the solenoid part 150. By this structure, the wedge 160 presses the solenoid part 150 and the displacement of the coil unit 124 is regulated by a reaction force when the coil unit 124 is assembled with the valve main body. That is, a contact state between the coil unit 124 and the solenoid part 150 is maintained, so that the rocking of the coil unit 124 is prevented. Accordingly, the generation of an abnormal noise may be suppressed.

Fifth Embodiment

A fifth embodiment of the invention will be described below. The present embodiment is to prevent the generation of an abnormal noise by the structure of the hydraulic control valve. Accordingly, the control method of the first or second embodiment does not need to be used necessarily.

Figure 12A:
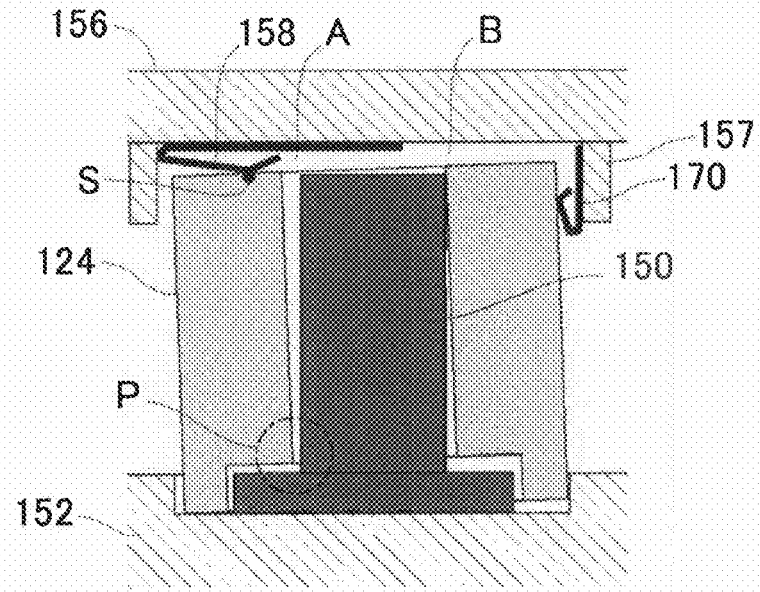
FIGS. 12A and 12B are views illustrating the structure of main parts of a hydraulic control valve according to a fifth embodiment.
Figure 12B:
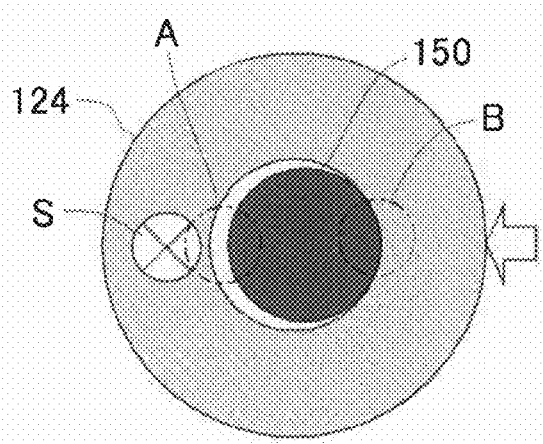

FIGS. 12A and 12B are views illustrating the structure of main parts of a hydraulic control valve according to a fifth embodiment. FIG. 12A is a side view of the hydraulic control valve, and FIG. 12B is a plan view of the hydraulic control valve.

In the hydraulic control valve of the present embodiment, a leaf spring 170 (which corresponds to an "elastic body") for biasing a coil unit 124 in a direction perpendicular to an axial direction is provided in addition to a leaf spring 158 between a terminal box 156 and the coil unit 124. That is, a spring seat part 157, which protrudes toward an actuator block 152, is provided on a terminal box 156, and a leaf spring 170 is interposed between an outer peripheral surface of the coil unit 124 and the spring seat part 157. As illustrated in FIGS. 12A and 12B, the leaf spring 170 is arranged on one side of the solenoid part 150 opposite to the leaf spring 158, and biases the coil unit 124 toward the solenoid part 150 from the outside of the coil unit 124. As a result, the inclined state of the coil unit 124, which is inclined by a biasing force of the leaf spring 158, is maintained. That is, the contact state between the coil unit 124 and the solenoid part 150 is maintained, so that the rocking of the coil unit 124 is prevented. Accordingly, the generation of an abnormal noise may be suppressed.

The invention is not limited to the above-mentioned embodiments. Various modifications such as a change of design may be made to the embodiments based on the knowledge of those skilled in the art, and the modifications are also included in the scope of the invention.

In the above-mentioned embodiments, as a brake control apparatus 20, there has been exemplified a apparatus that includes the pressure-increasing linear control valve 66 and the pressure-decreasing linear control valve 67 provided as a control valve common to the respective wheel cylinders 23 and includes a system for controlling upstream pressure of each of the wheel cylinders 23. In a modification, there may be employed a system that includes a pressure-increasing valve and a pressure-decreasing valve for separately performing linear control of the respective wheel cylinders 23. Further, each of the embodiments may be applied to at least one of the pressure-increasing valve and the pressure-decreasing valve. Furthermore, in the above-mentioned embodiments, a normally closed solenoid valve has been exemplified as the hydraulic control valve 101. However, a normally open solenoid valve may be applied. In addition, a linear control valve of which the opening is adjusted by the amount of supplied current has been exemplified in the above-mentioned embodiments. However, each of the embodiments may be applied to a switching valve (on-off valve) of which the opened state and the closed state are switched by the supply of current.

Further, in the above-mentioned embodiments, the solenoid valve control apparatus according to the invention has been provided as a brake control apparatus. However, each of the embodiments is not limited to a brake control apparatus, and may be applied to a apparatus for controlling the driving of a solenoid valve and an actuator with which a solenoid valve is assembled.

What is claimed is:

1. A solenoid valve control apparatus comprising:
   a base formed with passages through which a working fluid flows;
   a solenoid valve that includes a valve main body and a coil unit, the valve main body including a valve part and a solenoid part and being fixed to the base so as to make the solenoid part being exposed to the outside of the base, the coil unit being formed of an annular body around which a coil is wound and being arranged so as to surround the solenoid part, and the solenoid valve opening and closing the passages by the opening and closing of the valve part;
   a biasing member that pushes an end face of the coil unit and supports the coil unit by pressing the coil unit against the base; and
   a control unit that adjusts an opening of the solenoid valve by controlling the supply of current to the solenoid valve,
   wherein
   the control unit controls the supply of current during a period between the start and termination of the driving of the solenoid valve, while securing bias current for maintaining a contact state between at least an inner peripheral surface of the coil unit and an outer peripheral surface of the valve main body.

2. The solenoid valve control apparatus according to claim 1,
   wherein
   the solenoid valve control apparatus comprises a normally closed control valve that maintains a closed state when current is not supplied and is opened by the supply of current, and
   the control unit sets a value of current that maintains a closed state of the normally closed control valve as the bias current.

3. The solenoid valve control apparatus according to claim 1,
   wherein
   the solenoid valve control apparatus comprises a normally open control valve that maintains an opened state when current is not supplied and is closed by the supply of current, and
   the control unit sets a value of current that maintains an opened state of the normally open control valve as the bias current.

4. The solenoid valve control apparatus according to claims 1,
   wherein
   the solenoid valve control apparatus is formed of a hydraulic pressure control apparatus that controls hydraulic pressure of an object to be controlled by controlling the amount of working liquid as the working fluid, and
   the control unit sets target hydraulic pressure according to the control state of the object to be controlled, controls the supply of current so as to make hydraulic pressure of the object to be controlled approach the target hydraulic pressure, and supply the bias current only when a change rate of the target hydraulic pressure is equal to or smaller than a prescribed criterion value indicating that there is a possibility that an abnormal noise is generated by the collision between the coil unit and the valve main body.

5. The solenoid valve control apparatus according to claim 1, wherein
   when the supply of current to the solenoid valve is switched into an off state from an on state and when the supply of current to the solenoid valve is switched into the on state from the off state, the control unit gradually performs control so as to change a target value of current in multiple steps and reach each value of set current.

6. An actuator comprising:
   a base formed with passages through which a working fluid flows;
   a solenoid valve that includes a valve main body and a coil unit, the valve main body including a valve part and a solenoid part and being fixed to the base so as to make the solenoid part being exposed to the outside of the base, the coil unit being formed of an annular body around which a coil is wound and being arranged so as to surround the solenoid part, and the solenoid valve opening and closing the passages by the opening and closing of the valve part;
   a biasing member that pushes an end face of the coil unit and supports the coil unit by pressing the coil unit against the base; and
   a pressing member that presses at least one of the solenoid part and the coil unit in one direction during the driving of the solenoid valve and maintains the contact state there between.

7. The actuator according to claim 6,
   wherein
   a protrusion that protrudes from at least one of the solenoid part and the coil unit toward the other thereof and comes into close contact with the other is provided as the pressing member.

8. The actuator according to claim 6,
   wherein the pressing member is an elastic body that presses the coil unit against the solenoid part from the outside of the coil unit.

9. The actuator according to claim 8,
wherein
the elastic body is arranged so as to press the coil unit in a direction where the inclined state of the coil unit inclined by a biasing force of the biasing member is maintained.

10. An actuator comprising:

a base formed with passages through which a working fluid flows;

a solenoid valve that includes a valve main body and a coil unit, the valve main body including a valve part and a solenoid part and being fixed to the base so as to make the solenoid part being exposed to the outside of the base, the coil unit being formed of an annular body around which a coil is wound and being arranged so as to surround the solenoid part, and the solenoid valve opening and closing the passages by the opening and closing of the valve part; and a biasing member that pushes an end face of the coil unit and fixes the coil unit by pressing the coil unit against the base, wherein the valve main body is fixed to the base while being inclined so as to make an inner peripheral surface of the coil unit to be inclined by a biasing force of the biasing member being substantially parallel to an outer peripheral surface of the solenoid part.

* * * * *